United States Patent
Xu et al.

(10) Patent No.: US 11,026,148 B2
(45) Date of Patent: Jun. 1, 2021

(54) ELECTRONIC APPARATUS FOR WIRELESS COMMUNICATION AND WIRELESS COMMUNICATION METHOD

(71) Applicant: Sony Corporation, Tokyo (JP)

(72) Inventors: Xiaodong Xu, Beijing (CN); Shiqing Zhang, Beijing (CN); Xin Guo, Beijing (CN); Yunqiu Xiao, Beijing (CN); Yi Zhang, Beijing (CN); Mengying Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 56 days.

(21) Appl. No.: 16/340,138

(22) PCT Filed: Mar. 20, 2018

(86) PCT No.: PCT/CN2018/079594
§ 371 (c)(1),
(2) Date: Apr. 8, 2019

(87) PCT Pub. No.: WO2018/171580
PCT Pub. Date: Sep. 27, 2018

(65) Prior Publication Data
US 2019/0313315 A1    Oct. 10, 2019

(30) Foreign Application Priority Data

Mar. 23, 2017    (CN) .......................... 201710178660.2

(51) Int. Cl.
*H04W 36/30*    (2009.01)
*H04W 36/00*    (2009.01)
(Continued)

(52) U.S. Cl.
CPC ....... *H04W 36/30* (2013.01); *H04W 36/0085* (2018.08); *H04W 36/08* (2013.01); *H04W 52/0261* (2013.01); *H04W 88/04* (2013.01)

(58) Field of Classification Search
CPC .... H04B 7/14; H04W 36/0085; H04W 36/08; H04W 36/24; H04W 36/30; H04W 40/22;
(Continued)

(56) References Cited

U.S. PATENT DOCUMENTS

| 8,488,514 B2* | 7/2013 | Cai | ........................ | H04W 36/30 370/315 |
| 8,542,579 B2* | 9/2013 | Rong | ..................... | H04L 47/522 370/229 |

(Continued)

FOREIGN PATENT DOCUMENTS

| CN | 105188099 A | 12/2015 |
| CN | 105636106 A | 6/2016 |

(Continued)

OTHER PUBLICATIONS

3GPP, Study on extended architecture support for proximity-based services, Sep. 2015, 3GPP, vol. 13.0.0, Technical Report 23.713: Technical Specification Group Services and System Aspects (Year: 2015).*

(Continued)

*Primary Examiner* — Eric Nowlin
(74) *Attorney, Agent, or Firm* — Xsensus LLP

(57) ABSTRACT

The present disclosure relates to an electronic apparatus for wireless communication and a wireless communication method. According to one embodiment, an electronic apparatus for wireless communication comprises a processing circuit. The processing circuit is configured to: where a user equipment obtains, via a current relay device, a communication service from a current cell, acquire information about a candidate link, wherein the candidate link comprises a cellular link to another cell and a relay link passing through another relay device. The processing circuit is also configured to select, based on the information, a communication link to be applied to the user equipment from the candidate link.

16 Claims, 19 Drawing Sheets

(51) Int. Cl.
*H04W 36/08* (2009.01)
*H04W 52/02* (2009.01)
*H04W 88/04* (2009.01)

(58) Field of Classification Search
CPC ........... H04W 52/0261; H04W 84/005; H04W 88/04
See application file for complete search history.

(56) References Cited

U.S. PATENT DOCUMENTS

| | | | | |
|---|---|---|---|---|
| 8,543,054 B2* | 9/2013 | Ostergaard | ........ | H04W 72/1268 455/7 |
| RE44,606 E* | 11/2013 | Herz | ........ | H04L 45/125 455/445 |
| 8,576,766 B2* | 11/2013 | Wilhelmsson | .... | H04W 72/1215 370/315 |
| 8,830,861 B2* | 9/2014 | Chang | ........ | H04B 7/15528 370/252 |
| 8,867,985 B2* | 10/2014 | Yang | ........ | H04W 40/22 455/11.1 |
| 8,923,871 B2* | 12/2014 | Aminaka | ........ | H04B 7/155 455/444 |
| 8,976,662 B2* | 3/2015 | Somasundaram | .... | H04W 16/26 370/235 |
| 8,989,078 B2* | 3/2015 | Kwon | ........ | H04W 88/04 370/315 |
| 9,148,519 B1* | 9/2015 | Judge | ........ | H04M 7/0075 |
| 9,161,289 B2* | 10/2015 | Papadogiannis | ........ | H04W 40/12 |
| 9,179,468 B2* | 11/2015 | Kim | ........ | H04J 11/005 |
| 9,184,882 B2* | 11/2015 | Adjakple | ........ | H04L 1/1887 |
| 9,288,812 B2* | 3/2016 | Kim | ........ | H04W 72/082 |
| 9,426,811 B2* | 8/2016 | Kim | ........ | H04W 72/082 |
| 9,432,105 B2* | 8/2016 | Wager | ........ | H04B 7/15 |
| 9,526,056 B2* | 12/2016 | Tomici | ........ | H04W 28/08 |
| 9,635,558 B2* | 4/2017 | Borran | ........ | H04B 7/15 |
| 9,635,595 B2* | 4/2017 | Chen | ........ | H04W 36/30 |
| 9,736,886 B2* | 8/2017 | Kwon | ........ | H04B 7/0408 |
| 9,949,192 B1* | 4/2018 | Saleh | ........ | H04W 36/00835 |
| 9,954,658 B2* | 4/2018 | Wager | ........ | H04W 72/1289 |
| 10,129,918 B2* | 11/2018 | Fodor | ........ | H04W 24/10 |
| 10,165,418 B2* | 12/2018 | Yi | ........ | H04W 76/14 |
| 10,194,304 B2* | 1/2019 | Chen | ........ | H04W 8/24 |
| 10,292,095 B1* | 5/2019 | Park | ........ | H04B 7/026 |
| 10,326,516 B2* | 6/2019 | Zhao | ........ | H04B 7/0828 |
| 10,341,009 B2* | 7/2019 | Hwang | ........ | H04B 7/155 |
| 10,390,293 B2* | 8/2019 | Thyagarajan | ........ | H04W 36/03 |
| 10,624,018 B1* | 4/2020 | Oroskar | ........ | H04B 7/0452 |
| 10,624,155 B2* | 4/2020 | Kwon | ........ | H04B 7/0408 |
| 10,849,037 B2* | 11/2020 | Feng | ........ | H04W 36/165 |
| 2004/0242154 A1* | 12/2004 | Takeda | ........ | H04L 45/20 455/16 |
| 2008/0080436 A1* | 4/2008 | Sandhu | ........ | H04W 52/241 370/338 |
| 2008/0107075 A1* | 5/2008 | Ramachandran | ..... | H04L 45/124 370/331 |
| 2008/0232296 A1* | 9/2008 | Shin | ........ | H04B 7/2606 370/315 |
| 2008/0316968 A1* | 12/2008 | Sun | ........ | H04B 7/15535 370/331 |
| 2009/0034447 A1* | 2/2009 | Yu | ........ | H04B 7/15542 370/315 |
| 2010/0316096 A1* | 12/2010 | Adjakple | ........ | H04L 1/1887 375/211 |
| 2011/0081903 A1* | 4/2011 | Cai | ........ | H04W 36/0058 455/424 |
| 2011/0134828 A1* | 6/2011 | Osseiran | ........ | H04B 7/15521 370/315 |
| 2011/0269393 A1* | 11/2011 | Ostergaard | ........ | H04W 72/1284 455/7 |
| 2012/0040607 A1* | 2/2012 | Yang | ........ | H04W 40/22 455/9 |
| 2012/0063417 A1* | 3/2012 | Redana | ........ | H04W 36/22 370/331 |
| 2012/0230247 A1* | 9/2012 | Kwon | ........ | H04B 7/155 370/315 |
| 2012/0250545 A1* | 10/2012 | Papadogiannis | ...... | H04W 40/12 370/252 |
| 2012/0264368 A1* | 10/2012 | Aminaka | ........ | H04B 7/155 455/9 |
| 2012/0264430 A1* | 10/2012 | Kim | ........ | H04W 36/28 455/436 |
| 2012/0314609 A1* | 12/2012 | Chang | ........ | H04W 40/22 370/252 |
| 2013/0100929 A1* | 4/2013 | Liu | ........ | H04W 36/0016 370/331 |
| 2013/0195005 A1* | 8/2013 | Al-Shalash | ........ | H04W 36/18 370/315 |
| 2013/0242793 A1* | 9/2013 | Lu | ........ | H04W 40/22 370/252 |
| 2013/0242855 A1* | 9/2013 | Kim | ........ | H04L 5/0035 370/315 |
| 2013/0315193 A1* | 11/2013 | Kim | ........ | H04L 1/1858 370/329 |
| 2013/0322323 A1* | 12/2013 | Kim | ........ | H04W 72/082 370/315 |
| 2014/0064158 A1* | 3/2014 | Timus | ........ | H04W 36/30 370/279 |
| 2014/0133387 A1* | 5/2014 | Wagner | ........ | H04B 7/15 370/315 |
| 2014/0349647 A1* | 11/2014 | Chen | ........ | H04W 36/30 455/436 |
| 2015/0163852 A1* | 6/2015 | Kwon | ........ | H04B 7/0408 370/315 |
| 2016/0150390 A1* | 5/2016 | Chen | ........ | H04W 48/16 370/311 |
| 2016/0205555 A1 | 7/2016 | Agiwal et al. | | |
| 2016/0286374 A1* | 9/2016 | Baghel | ........ | H04W 24/10 |
| 2016/0286471 A1* | 9/2016 | Zisimopoulos | ........ | H04W 48/16 |
| 2016/0294513 A1* | 10/2016 | Wager | ........ | H04B 7/15 |
| 2016/0337954 A1* | 11/2016 | Gulati | ........ | H04B 7/155 |
| 2017/0027009 A1* | 1/2017 | Dumpala | ........ | H04B 17/309 |
| 2017/0127251 A1* | 5/2017 | Yi | ........ | H04W 28/0278 |
| 2017/0244468 A1* | 8/2017 | Zhao | ........ | H04W 48/16 |
| 2017/0251507 A1* | 8/2017 | Fodor | ........ | H04W 24/10 |
| 2017/0317740 A1* | 11/2017 | Basu Mallick | ... | H04W 52/0229 |
| 2017/0325243 A1* | 11/2017 | Yasukawa | ........ | H04W 88/04 |
| 2017/0359116 A1* | 12/2017 | Hwang | ........ | H04B 17/309 |
| 2017/0367147 A1* | 12/2017 | Kwon | ........ | H04B 7/0408 |
| 2018/0063768 A1* | 3/2018 | Martin | ........ | H04W 36/30 |
| 2018/0115931 A1* | 4/2018 | Lee | ........ | H04W 48/20 |
| 2018/0139667 A1* | 5/2018 | Yu | ........ | H04B 7/15528 |
| 2018/0160287 A1* | 6/2018 | Wu | ........ | H04W 8/005 |
| 2018/0184436 A1* | 6/2018 | Ohtsuji | ........ | H04B 7/2606 |
| 2018/0206176 A1* | 7/2018 | Panteleev | ........ | H04W 72/1231 |
| 2018/0213379 A1* | 7/2018 | Xiong | ........ | H04W 88/04 |
| 2018/0255505 A1* | 9/2018 | Thyagarajan | ........ | H04W 8/005 |
| 2018/0324611 A1* | 11/2018 | Yi | ........ | H04W 4/08 |
| 2018/0359765 A1* | 12/2018 | Jung | ........ | H04W 72/10 |
| 2019/0037463 A1* | 1/2019 | Feng | ........ | H04W 76/14 |
| 2019/0200288 A1* | 6/2019 | Folke | ........ | H04W 48/20 |
| 2019/0223066 A1* | 7/2019 | Xu | ........ | H04W 36/0058 |
| 2019/0313315 A1* | 10/2019 | Xu | ........ | H04W 36/0085 |
| 2019/0326979 A1* | 10/2019 | Hwang | ........ | H04B 17/309 |
| 2019/0380065 A1* | 12/2019 | Kim | ........ | H04L 47/20 |
| 2020/0029391 A1* | 1/2020 | Xu | ........ | H04W 4/70 |
| 2020/0037218 A1* | 1/2020 | Karampatsis | ..... | H04W 36/0058 |
| 2020/0045564 A1* | 2/2020 | Yun | ........ | H04B 7/2606 |
| 2020/0137637 A1* | 4/2020 | Xu | ........ | H04W 36/0072 |
| 2020/0245409 A1* | 7/2020 | Kwon | ........ | H04B 7/2606 |
| 2020/0296745 A1* | 9/2020 | Inokuchi | ........ | H04W 72/121 |
| 2020/0336881 A1* | 10/2020 | Zheng | ........ | H04W 4/12 |
| 2020/0383149 A1* | 12/2020 | Rico Alvarino | ...... | H04W 24/10 |
| 2021/0037549 A1* | 2/2021 | Akkarakaran | ...... | H04W 72/048 |

FOREIGN PATENT DOCUMENTS

CN 105657643 A 6/2016
EP 3103306 B1 * 10/2019

(56) References Cited

FOREIGN PATENT DOCUMENTS

| KR | 20170138877 A | * | 12/2017 | ............ | H04W 76/34 |
| WO | 2016/162852 A1 | | 10/2016 | | |
| WO | WO-2017213438 A1 | * | 12/2017 | ............. | H04L 47/54 |

OTHER PUBLICATIONS

Interdigital Communications, On Relay Selection/Reselection for UE-to-Network Relays, May 25, 2015, 3GPP, 3GPP TSG-RAN WG2 #90, Tdoc: R2-152680 (Year: 2015).*
Intel Corporation, Discussion on Measurements for L3 UE-to-NW Relaying Support, May 25, 2015, 3GPP, 3GPP TSG RAN WG1 Meeting #81, Tdoc: R1-152928 (Year: 2015).*
Intel Corporation, Procedures for Support of UE-to-NW Relaying, May 25, 2015, 3GPP, 3GPP TSG RAN WG1 Meeting #81, Tdoc: R1-152929 (Year: 2015).*
ITRI, Consideration Relay selection and discovery for UE-to-Network Relay, May 25, 2015, 3GPP, 3GPP TSG RAN WG1 Meeting #80bis, Tdoc: R1-152946 (Year: 2015).*
Sony, Discussion on UE-to-Network Relay measurement, May 25, 2015, 3GPP, 3GPP TSG RAN WG1 Meeting #80bis, Tdoc: R1-153087 (Year: 2015).*
Alcatel-Lucent et al., Procedures and mechanism for L3-based UE-to-network relay discovery, May 25, 2015, 3GPP, 3GPP TSG RAN WG1 Meeting #80bis, Tdoc: R1-152669 (Year: 2015).*
Huawei et al., WF on UE-to-Network Relay, May 25, 2015, 3GPP, 3GPP TSG RAN WG1 Meeting #80bis, Tdoc: R1-153542 (Year: 2015).*
ZTE, Remaining issues on relay UE selection, Aug. 24, 2015, 3GPP, 3GPP TSG-RAN WG1 Meeting #82, Tdoc: R1-154049 (Year: 2015).*
Samsung, Evaluation results of relay selection schemes, Aug. 24, 2015, 3GPP, 3GPP TSG RAN WG1 Meeting #82, Tdoc: R1-154127 (Year: 2015).*
Huawei et al., Inclusion of Uu link quality for relay selection, Aug. 24, 2015, 3GPP, 3GPP TSG RAN WG1 Meeting #82, Tdoc: R1-154338 (Year: 2015).*
Ericsson, UE-NW Relay Selection/Reselection Rules for Out-of-coverage Remote UE, Aug. 24, 2015, 3GPP, 3GPP TSG RAN WG1 Meeting #82, Tdoc: R1-154441 (Year: 2015).*
Intel Corporation, Discussion on Uu link quality for UE-to-NW relay operation, Aug. 24, 2015, 3GPP, 3GPP TSG RAN WG1 Meeting #82, Tdoc: R1-154585 (Year: 2015).*
Alcatel-Lucent et al., Consideration of use of Uu link quality for Relay UE selection, Aug. 24, 2015, 3GPP, 3GPP TSG RAN WG1 Meeting #82, Tdoc: R1-154597 (Year: 2015).*
Qualcomm Incorporated, Support of Uu link quality in relay selection, Aug. 24, 2015, 3GPP, 3GPP TSG RAN WG1 Meeting #82 , Tdoc: R1-154721 (Year: 2015).*
Fujitsu, The remote UE access to relay from neighbor cell, Aug. 24, 2015, 3GPP, 3GPP TSG-RAN WG2 Meeting#91, Tdoc: R2-153107 (Year: 2015).*
Intel Corporation, Radio quality criteria for the (re)selection of the relay UE, Aug. 24, 2015, 3GPP, 3GPP TSG RAN WG2 Meeting #91, Tdoc: R2-153283 (Year: 2015).*
Qualcomm Incorporated, Relay UE Selection and Reselection Mechanisms, Aug. 24, 2015, 3GPP, 3GPP TSG-RAN WG2 Meeting #91, Tdoc: R2-153751 (Year: 2015).*
ZTE et al., Discussion on Remote UE's Relay discovery, selection and reselection, Aug. 24, 2015, 3GPP, 3GPP TSG RAN WG2 #91, Tdoc: R2-153766 (Year: 2015).*
CATT, Relay Selection Issues, Aug. 24, 2015, 3GPP, 3GPP TSG RAN WG2 Meeting #91, Tdoc: R2-153808 (Year: 2015).*
LG Electronics Inc., Inter-cell relay selection, Aug. 24, 2015, 3GPP, 3GPP TSG-RAN WG2 #91, Tdoc: R2-153826 (Year: 2015).*
Ericsson, Relay reselection with Model B, Nov. 16, 2015, 3GPP, 3GPP TSG-RAN WG2#92, Tdoc: R2-156578 (Year: 2015).*
International Search Report dated Jun. 8, 2018 for PCT/CN2018/ 079594 filed on Mar. 20, 2018, 8 pages including English Translation.

* cited by examiner

ELECTRONIC APPARATUS FOR WIRELESS COMMUNICATION AND WIRELESS COMMUNICATION METHOD

CROSS-REFERENCE TO RELATED APPLICATIONS

The present application is based on PCT filing PCT/CN2018/079594, filed Mar. 20, 2018 which claims priority to CN 201710178660.2 filed Mar. 23, 2017, the entire contents of each are incorporated herein by reference.

TECHNICAL FIELD

The present disclosure generally relates to the field of wireless communication, and in particular to an electronic device for wireless communication and a wireless communication method.

BACKGROUND

User equipment (UE) to network relay (UE-to-Network Relay) refers to that a remote UE can communicate with a base station (eNB) via a relay UE, which can expand the network coverage, improve a user rate at the edge of a cell, and improve a spectrum reusability. In the research of 3GPP (3rd Generation Partnership Project) Release 12 for Proximity-based service (ProSe) communication, device-to-device discovery and communication can be performed in the cell and between cells. It is a typical case that the remote UE and the relay UE are served by the same eNB. However the remote UE and the relay UE may be in different serving cells before the relay service is activated, so a handover procedure may be required.

SUMMARY

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

According to an embodiment, an electronic device for wireless communication is provided. The electronic device includes a processing circuitry configured to: in a case where a user equipment obtains a communication service from a current cell via a current relay equipment, acquire information related to candidate links including a cellular link to another cell and a relay link via another relay equipment. The processing circuitry is further configured to select a communication link to be applied to the user equipment from the candidate links based on the information.

According to another embodiment, a wireless communication method is provided. The wireless communication method includes: in a case where a user equipment obtains a communication service from a current cell via a current relay equipment, acquiring information related to candidate links including a cellular link to another cell and a relay link via another relay equipment; and selecting a communication link to be applied to the user equipment from the candidate links based on the information.

According to yet another embodiment, an electronic device for wireless communication is provided. The electronic device includes a processing circuitry configured to: when a quality of a relay link between a user equipment and a first relay equipment is decreased to a predetermined level, trigger the user equipment to perform a link measurement including a measurement on a cellular link between the user equipment and a neighboring cell.

According to still another embodiment, a wireless communication method is provided. The wireless communication method includes: when a quality of a relay link between a user equipment and a first relay equipment is decreased to a predetermined level, triggering the user equipment to perform a link measurement including a measurement on a cellular link between the user equipment and a neighboring cell.

Embodiments of the above aspects can achieve at least one of the following effects: enabling a user equipment to obtain better service, ensuring service continuity, reducing power consumption of the remote user equipment during link switching and the time delay during link establishing.

According to yet another embodiment, an electronic device for wireless communication is provided. The electronic device includes a processing circuitry configured to: in a case where a user equipment obtains a communication service from a current cell via a current relay equipment, acquire information related to a state of a link between the user equipment and the current relay equipment and a state of a link between the current relay equipment and the current cell. The processing circuitry is further configured to adjust, based on the information, a measurement configuration of the user equipment with regard to candidate links including a cellular link to the current cell or another cell and a relay link via another relay equipment.

According to still another embodiment, a wireless communication method is provided. The wireless communication method includes: in a case where a user equipment obtains a communication service from a current cell via a current relay equipment, acquiring information related to a state of a link between the user equipment and the current relay equipment and a state of a link between the current relay equipment and the current cell; and adjusting, based on the information, a measurement configuration of the user equipment with regard to candidate links including a cellular link to the current cell or another cell and a relay link via another relay equipment.

Embodiments of the above aspects can achieve at least one of the following effects: avoiding conflict between a relay link measurement and a cellular link measurement; effectively reducing power consumption of the remote user equipment in the measurement by adaptively adjusting the measurement configuration based on the state of the link.

BRIEF DESCRIPTION OF THE DRAWINGS

The present disclosure may be understood better with reference to the description given in conjunction with drawings hereinafter. The same or similar reference numerals are used to indicate the same or similar components throughout all the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF THE EMBODIMENTS

Figure 1:
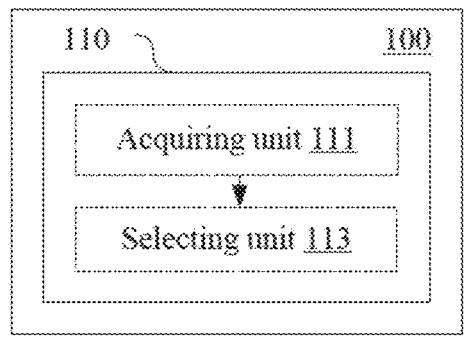
FIG. 1 is a block diagram showing a configuration example of an electronic device for wireless communication according to an embodiment of the present disclosure.

Hereinafter embodiments of the present disclosure are described with reference to the drawings. Elements and features described in one drawing or one embodiment of the present disclosure may be combined with elements and features described in one or more other drawings or embodiments. It should be noted that, indication and description of components and processing which are not related to the present disclosure or well known for those skilled in the art are omitted in the drawings and illustrations for clearness.

As shown in FIG. 1, an electronic device 100 for wireless communication according to an embodiment includes a processing circuitry 110. The processing circuitry 110 may be implemented, for example, as a specific chip, chipset, or central processing unit (CPU), etc.

The processing circuitry 110 includes an acquiring unit 111 and a selecting unit 113. It should be noted that, although the units are shown as functional blocks in the drawing, it should be understood that functions of the units may be implemented by the processing circuitry 110 as a whole, and are not necessarily implemented by discrete actual components in the processing circuitry 110. In addition, although the processing circuitry 110 is shown by one block, the electronic device 100 may include multiple processing circuitries. The functions of the acquiring unit 111 and the selecting unit 113 may be distributed onto multiple processing circuitries, and thus the multiple processing circuitries cooperate to perform the functions.

The acquiring unit 111 is configured to, in a case where a user equipment obtains a communication service from a current cell via a current relay equipment, acquire information related to candidate links. The candidate links may include a cellular link to another cell and a relay link via another relay equipment.

Herein, the cellular link includes a Uu link between a UE and an eNB. The relay link includes a link that a remote UE communicates with an eNB via a relay UE by means of a PC5 interface between the remote UE and the relay UE. In this specification, a relay link may also be referred to as a Sidelink or PC5 link.

The selecting unit 113 is configured to select a communication link to be applied to the user equipment from the candidate links based on the information acquired by the acquiring unit 111.

According to an embodiment, the selection of the communication link performed by the selecting unit 113 may include: determining priorities of the candidate links based on the information acquired by the acquiring unit 111; and selecting the communication link from the candidate links based on the determined priorities.

It should be noted that the process of selecting the communication link by the selecting unit 113 based on the priorities does not necessarily include a process of calculating or determining the priorities as a specific parameter or variable and a process of sorting the communication links. For example, the process of selecting the communication link may be that a certain communication link is preferentially selected in a case where the information acquired by the acquiring unit 111 indicates a certain situation, and another communication link is preferentially selected in a case where the information indicates another situation. In this case, although there is substantially a consideration on priorities in the selection process of the communication link, the process of specific calculation or determination of priorities and sorting is not included.

An exemplary manner of communication link selection according to an embodiment is more specifically described below with reference to the application scenario example illustrated in FIG. 7.

Figure 7:
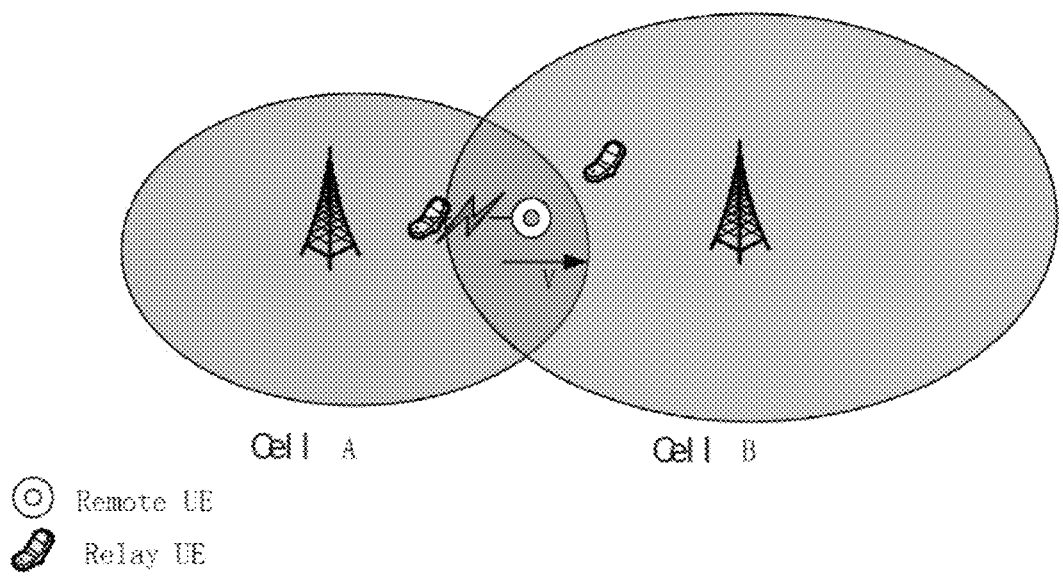
FIG. 7 is a schematic diagram showing an application scenario example of relay reselection and cell handover.

In the scenario shown in FIG. 7, the remote UE is in the coverage of cell A and has established a PC5 link with a relay UE, while the remote UE is moving from cell A to cell B. At this time, the quality of the PC5 link between the remote UE and the current relay UE may be decreased, and the quality of the Uu link of the cell A may also decreased, and the quality of the Uu link of an adjacent cell B may be increased. The measurement result of the remote UE may satisfy a relay reselection condition (the relay reselection refers to a case that the remote UE needs to reselect the relay UE due to the radio link quality or other reasons after establishing a connection with a relay UE) and a cell handover condition. A scheme for determining a path switching manner of the remote UE especially in this case is provided in this embodiment. For example, it is determined whether to switch from a PC5 link to another PC5 link of the cell A or the cell B, or to switch from the PC5 link to a Uu link of the cell B. In different situations, the remote UE performing different link switching may have different effects on service continuity. By performing communication link selection according to the present embodiment, for example, the remote UE can be better served in terms of service continuity, link switching power consumption, and delay. In the above example, the cell may be a macro cell or a small cell.

More specifically, the communication link selection may be performed as follows.

In a case where a handover target cell B does not support the UE-to-Network Relay, that is, the remote UE will be directly served by the base station in the cell B after the handover it is required to compare the quality of the Uu link of the cell B and the quality of other PC5 link of the cell A after the handover, for better service. If the quality of the Uu link is better after the handover, the remote UE performs the handover from the cell A to the cell B. If the quality of other PC5 link is better, the remote UE performs the relay reselection and continues to be served by a relay UE of the cell A.

In a case where a handover target cell B supports the UE-to-Network Relay and the quality of the Uu link of the remote UE is better after the handover, that is, the remote UE can obtain a better service by directly connecting to the base station in the cell B, it may be considered that direct handover is better than the relay reselection, so the remote UE performs the handover from the cell A to the cell B.

In a case where a handover target cell B supports the UE-to-Network Relay and the quality of the Uu link of the remote UE is not good enough after the handover, it may be considered that the relay reselection is better than the direct handover. The reason is that the remote UE after the handover is likely to perform the relay selection, following A) and B) in this case are described as follows.

A) If there is a better relay UE of the cell A or no relay UE of the cell B is found, the remote UE is likely to select the relay UE of the cell A to communicate, and thus the remote UE needs to switch back to the cell A to obtain a better service. Performing the handover twice may increase network signaling overhead and may reduce the service continuity of the remote UE.

B) If there is a better relay UE of the cell B, the remote UE may perform the auxiliary handover by the reselected relay UE of the cell B, which may reduce the air interface signaling process and improve the service continuity of the remote UE. The reason is that, for example, the random access procedure during the handover process may be skipped.

Therefore, the remote UE may first sort the discovered relay UEs. If the relay UE with the best general condition is the relay UE of the cell A, the remote UE may temporarily delay the handover and the remote UE is served by the relay UE of the cell A. If the relay UE with the best general condition is the UE of the cell B, the remote UE may establish a connection with the relay UE, and complete the auxiliary handover procedure by the relay UE of the cell B.

For the remote UE in the link state, when the remote UE satisfies the relay reselection condition, the candidate relay UEs may be sorted to determine the optimal relay UE. Furthermore, the entity performing the sorting may be the remote UE or the eNB. In addition to considering the quality of the PC5 link and the quality of the candidate relay UE link, the following factors may also be considered.

The remote UE is likely to perform the handover when establishing a connection with the relay UE of a neighboring cell. Therefore, when the remote UE does not satisfy the handover condition, the relay UE of the current cell should be given a higher weight than the relay UE of the neighboring cell. When the remote UE satisfies the handover condition, the relay UE of the neighboring cell should be given a higher weight.

When a battery level of the remote UE is low, the remote UE needs a more stable relay UE. If the Uu link of the relay UE satisfies the Uu link stability condition, the Uu link of the relay UE should be given a higher weight.

A sorting strategy of the relay UE is given above for a scenario that the remote UE discovers multiple candidate relay UEs. In the sorting strategy, factors other than link quality, such as the battery level, is considered, which facilitates the remote UE to select the most suitable relay UE.

According to an embodiment, the information acquired by the acquiring unit 111 may include a cell to which a candidate relay equipment belongs, and the selecting unit 113 is configured to: in a case where the user equipment does not satisfy a cell handover condition, make the priority of a candidate relay equipment of the current cell higher than that of a candidate relay equipment of another cell; and in a case where the user equipment satisfies a cell handover condition, making the priority of a candidate relay equipment of a handover target cell higher than that of a candidate relay equipment of the current cell.

According to another embodiment, the information acquired by the acquiring unit 111 may include information related to remaining battery level of the user equipment, and the selecting unit 113 is configured to: in a case where the battery level of the user equipment is lower than a predetermined level, make a candidate relay equipment having a higher quality of cellular link (such as, a more stable cellular link quality) has a higher priority.

According to yet another embodiment, the information acquired by the acquiring unit 111 may include information about a measurement result of a cellular link of the user equipment to another cell; and information indicating whether another cell supports a relay link.

In a case where the another cell supports the relay link, the selecting unit 113 is configured to: if a quality of the cellular link between the user equipment and the another cell is higher than a predetermined level, the priority of the cellular link to the another cell is higher than that of a relay link via another relay equipment; and if a quality of the cellular link between the user equipment and the another cell is lower than a predetermined level, the priority of the cellular link to the another cell is lower than that of a relay link via another relay equipment.

In a case where the another cell does not support the relay link, the priorities are determined based on one or more of the following aspects: a quality of a link between the user equipment and a candidate relay equipment; a quality of the cellular link between the user equipment and the another cell; a remaining battery level of the user equipment and/or a candidate relay equipment; and a traffic characteristic of the user equipment.

Next, an exemplary manner of the above-described information acquired by the acquiring unit 111 is described.

For example, when the communication link selection is performed at the base station side, the corresponding information may be obtained from the user equipment in the following manner.

When a measurement reporting condition is satisfied, the UE needs to report a measurement result to the eNB. The remote UE or the relay UE needs to report the measurement ID, the measurement result of the serving cell, and the measurement result of the neighboring cell to the eNB of the serving cell, and may also report the following additional information, for example, to help the eNB make a link handover decision, thereby better guarantee service continuity.

Remaining Battery Level State

"00" represents that the remaining battery level is greater than 75%:

"01" represents that the remaining battery level ranges from 50% to 75%;

"10" represents that the remaining battery level ranges from 25% to 50%:

"11" represents that the remaining battery level is less than 25%.

Target cell information (optionally, only for the remote UE)

"00" represents that the target cell supports the UE-to-Network Relay, and the remote UE threshold condition is not satisfied after the handover (that is, the quality of the Uu link of the remote UE is good);

"01" represents that the target cell supports the UE-to-Network Relay, and the remote UE threshold condition is satisfied after the handover (that is, the quality of the Uu link of the remote UE is not good enough);

"10" represents that the target cell does not support the UE-to-Network Relay;

"11" represents a regular A3 event or other event (A3 event is the trigger condition for the measurement report, which means that the offset of the neighboring cell is better than that of the serving cell, and which can be used for intra-frequency handover).

Relay UE information (optionally, only for the remote UE)

This field is valid only when the target cell information≠"11". This field indicates optimal M relay UEs satisfying the sidelink discovery reference signal received power (SD-RSRP) threshold condition. The remote UE may indicate whether to maintain a connection with a certain relay UE. If the connection is maintained with a certain relay UE, the relay UE has the highest priority.

For example, the Relay UE information may include the contents shown in the following table.

| Relay UE ID | Relay UE cell ID | PC5 link quality | Connected (1/0) |
| --- | --- | --- | --- |

New measurement report is beneficial for the eNB or the remote UE to perform different link selections based on different measurement results of the remote UE when the handover condition is met, so that the remote UE obtains better service when performing the link selection, and service continuity is ensured during the remote UE performs the link handover.

It should be noted that the information given in the above example and its form are merely illustrative and not limiting.

For example, the quality of the link between the user equipment and the candidate relay equipment in the above example is characterized by SD-RSRP, however the present disclosure is not limited thereto. For example, the quality of the link between the user equipment and the candidate relay equipment may also be characterized by sidelink reference signal received power (S-RSRP).

The electronic device according to the present embodiment may be arranged at the user equipment side. More specifically, the communication link of the remote UE may be determined at the remote UE side.

Figure 8:
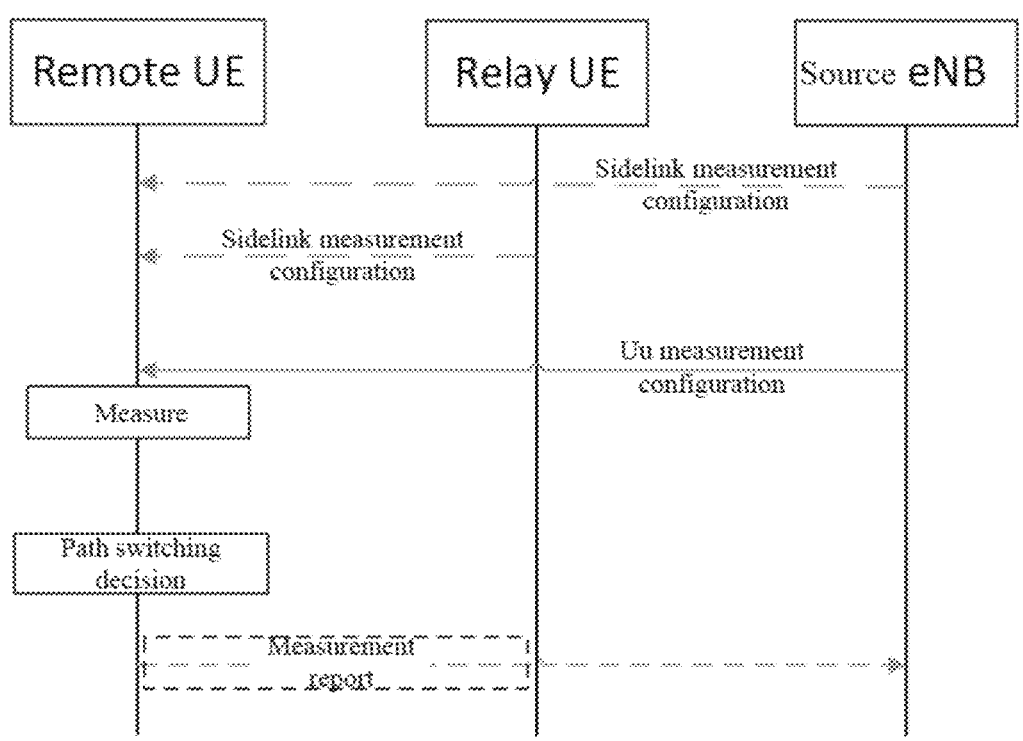
FIG. 8 is a schematic diagram showing an overall flow of a path switching determination process according to an exemplary embodiment.

FIG. 8 is an example showing an overall flow of a path switching determination process in a case where the path switching decision is made at the remote UE side.

As shown in FIG. 8, first, a source eNB (current cell base station) or a relay UE sends a sidelink measurement configuration to a remote UE, and the source eNB sends a Uu measurement configuration to the remote UE. Next, the remote UE performs sidelink measurement and Uu measurement by using the received measurement configuration, and makes a path switching decision based on the measurement result. Alternatively, the remote UE may send a measurement report to the base station.

Furthermore, according to an embodiment, the user equipment may prevent a measurement report related to a cell handover in a case where the user equipment selects to continue to adopt a relay link. A case that it is selected to continue to adopt a relay link may include deciding to perform a relay reselection or continuing to be served by the current relay UE.

The Remote UE may be a UE having the same capability as the Relay UE. Alternatively, the remote UE may be, for example, a wearable device having a weaker function than current smartphones. According to an embodiment, the user equipment may include a Machine Type Communication (MTC) equipment.

In recent years, the use of LTE (Long Term Evolution) technology to achieve MTC equipment connectivity and communication has received attention in the industry. In many scenarios, these low-energy devices are wearable devices and are less distant from the smartphones around the people. In this case, using the smart phone as a relay device of the wearable device, that is, the UE-to-Network communication manner, the power consumption of the wearable device can be reduced.

For example, the Relay UE may be a conventional LTE UE (Category 1+), and the Remote UE may be a conventional LTE UE, an eMTC (Enhanced Machine Type Communication) UE (Category M1) or an NB-IoT (Narrowband Internet of Things) UE (Category NB). For example, a conventional LTE UE can support the entire system bandwidth, a category M1 UE can only support 6PRB (physical resource block) bandwidth, and an NB-IoT UE can only support 1PRB bandwidth.

In addition, an MTC equipment usually have low mobility, such as wireless POS (point of sale) and a health monitoring terminal in the home environment, all of which have the features such as low speed and small range. When the quality of the Uu link or PC5 link of the MTC equipment is poor, the MTC equipment may seek assistance from the relay UE or switch to a neighboring cell with a better link quality.

Considering the power consumption requirements of such devices and a fact that the power consumption of the Uu link is generally higher than the power consumption of the PC5 link, according to an embodiment, the relay link is preferentially selected as a communication link to be applied to the MTC equipment.

It should be noted that the present embodiment is not limited to the MTC equipment, but can be applied to, for example, an equipment having a remaining battery level lower than a predetermined level or an equipment having a specific requirement for power consumption.

In addition, although the MTC equipment is described in the above examples, the Proximity-based service communication may include other types such as, but not limited to, device-to-device (D2D) communication, vehicle-to-everything (V2X) communication, Internet of Things (IOT) communication, etc. The V2X communication may include vehicle-to-vehicle (V2V) communication, vehicle-to-person (V2P) communication, and vehicle-to-infrastructure (V2I) communication, and the like.

Figure 9:
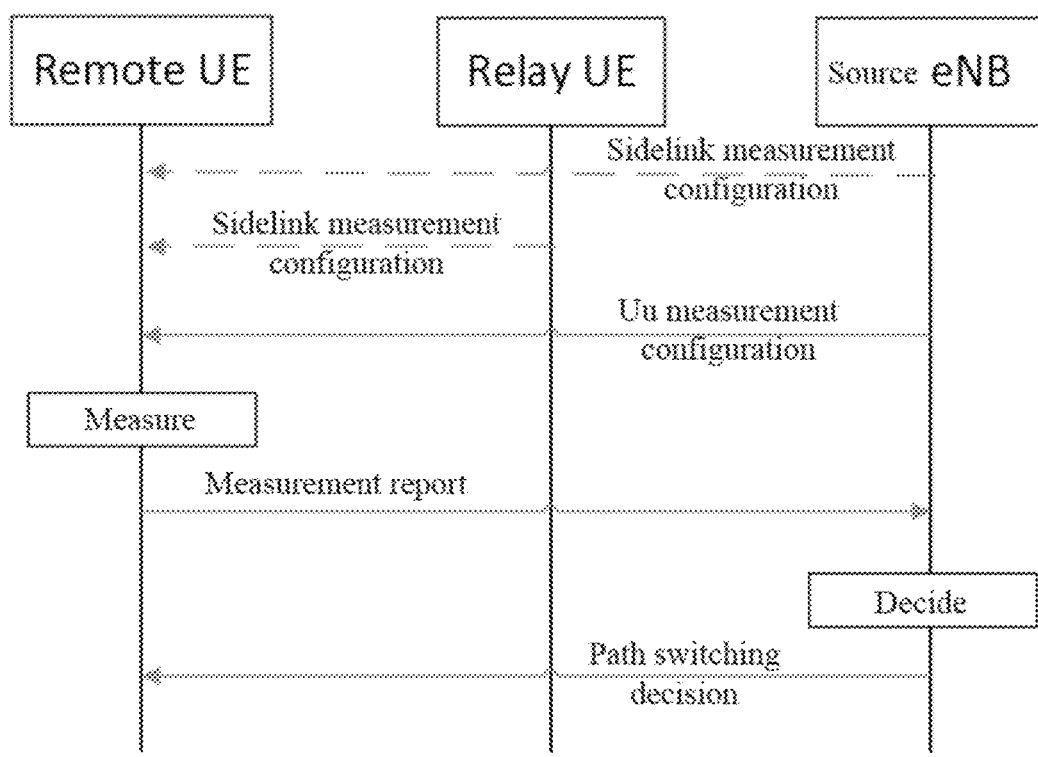
FIG. 9 is a schematic diagram showing an overall flow of a path switching determination process according to another exemplary embodiment.

The electronic device according to the embodiment of the present disclosure may be arranged at a base station side. FIG. 9 is an example showing an overall flow of a path switching determination process in a case where the path switching decision is made at the base station side.

As shown in FIG. 9, first, a source eNB or a relay UE sends a sidelink measurement configuration to a remote UE, and the source eNB sends a Uu measurement configuration to the remote UE. Next, the remote UE performs measurement by using the received measurement configuration, and send a measurement report to the source eNB. The eNB makes a path switching decision based on the measurement report and sends the path switching decision to the remote UE.

Next, an exemplary manner of making a decision based on a received measurement report in a case where the decision entity is arranged at the eNB side will be described with reference to FIG. 10. In this example, the form of the measurement report follows the form in the previous examples for purposes of illustration and not limitation.

Figure 10:
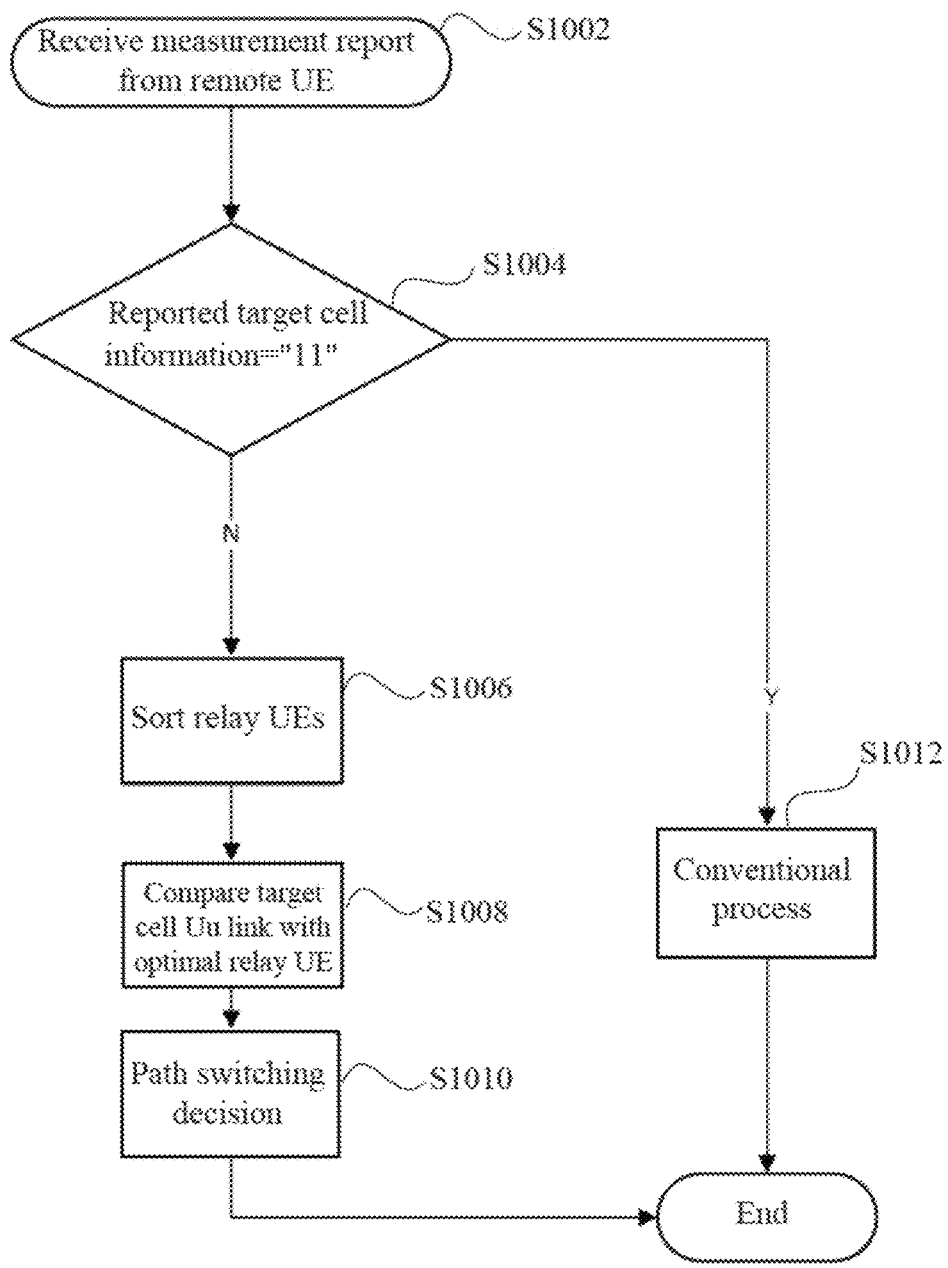
FIG. 10 is a flowchart showing a path switching determination process according to an exemplary embodiment.

As shown in FIG. 10, in S1002, a measurement report is received from the remote UE. In a case where the reported target cell information is "11" (Y in S1004), a conventional process is performed in S1012. On the other hand, in a case where the reported target cell information is not "1" (N in S1004), the relay UEs are sorted (S1006), the target cell Uu link is compared with the optimal relay UE (S1008), and a path switching decision is made (S1010).

More specifically, the eNB may select an optimal relay UE from the candidate relay UEs reported by the relay UE according to the foregoing sorting criterion, and compare the optimal relay UE with the target cell Uu link quality.

If the target cell supports the UE-to-Network Relay and the target cell Uu link quality is good, that is, the target cell information="00", the priority of the cell handover is higher than the priority of the relay reselection or the priority of continuing to be served by the current relay UE.

If the target cell supports the UE-to-Network Relay and the target cell Uu link quality is not good, that is, the target cell information="01", the priority of the relay reselection or the priority of continuing to be served by the current relay UE is higher than the priority of the cell handover.

If the target cell does not support the UE-to-Network Relay, that is, the target cell information="10", the priority of the relay selection and the priority of the handover may be determined as follows.

When the battery level of the remote UE is low, for example, the remaining battery level state="11": if the battery level of the optimal relay UE is low, the priority of the handover is higher than the priority of the relay selection or the priority of continuing to be served by the current relay UE; if the battery level of the optimal relay UE is high and the quality of the PC5 link between the optimal relay UE and the remote UE is higher than the quality of the neighboring cell Uu link, the priority of the relay reselection or the priority of continuing to be served by the current relay UE is higher than the priority of the handover; if the battery level of the optimal relay UE is high and the quality of the PC5 link between the optimal relay UE and the remote UE is lower than the quality of the neighboring cell Uu link, and the priority of the handover is high.

When the battery level of the remote UE is high: if the quality of the PC5 link between the optimal relay UE and the remote UE is higher than the quality of the neighboring cell Uu link, the priority of the relay reselection or the priority of continuing to be served by the current relay UE is higher than the priority of the handover; if the quality of the PC5 link between the optimal relay UE and the remote UE is lower than the quality of the neighboring cell Uu link, the priority of the relay reselection or the priority of continuing to be served by the current relay UE is lower than the priority of the handover; if the quality of the PC5 link between the optimal relay UE and the remote UE is not much different from the quality of the neighboring cell Uu link, the priority of the handover is higher in a case where the remote UE has a higher service delay requirement, and the priorities may be determined based the link qualities in a case where the remote UE has a lower service delay requirement.

In the above example, the comparison criteria for the link qualities may be determined according to a specific application.

In a case where the decision made by the eNB is relay reselection and the optimal relay UE is a neighboring cell relay UE, the source cell eNB may not know the resource usage and the operation state of the optimal relay UE of the target cell, therefore, the source eNB may request the target eNB for the cross-cell resource allocation, and coordinate the resources between the remote UE and the optimal relay UE, thereby completing the establishment of the fast PC5 link and reducing the delay in establishing the link.

Correspondingly, according to an embodiment, in a case where the selected communication link to be applied to the user equipment is a relay link via a relay equipment of another cell, a base station of the another cell is requested for a resource allocation for the relay link.

The above describes an example process of path switching determination in conjunction with a specific example. The above process may be performed, for example, in response to the following trigger condition: a quality of a link between the remote UE and the current relay UE is lower than a predetermined level; or a signaling for the remote UE indicates that the current relay UE is not to be used anymore.

In the above description of the electronic device according to the embodiment of the present disclosure, some processes and methods are disclosed apparently. Subsequently, a wireless communication method according to an embodiment of the present disclosure is described without repeating the details described above.

Figure 2:
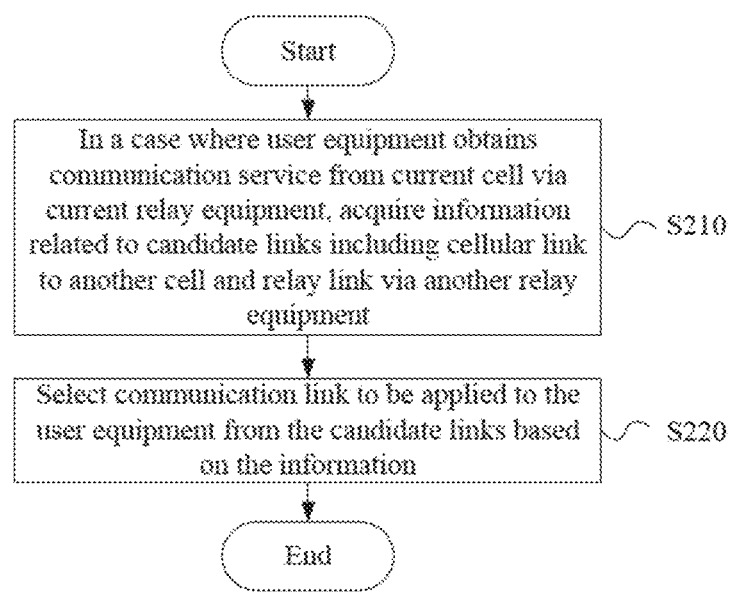
FIG. 2 is a flowchart showing a process example of a wireless communication method according to an embodiment of the present disclosure.

As shown in FIG. 2, the wireless communication method according to the present embodiment includes the following steps.

In step S210, in a case where a user equipment obtains a communication service from a current cell via a current relay equipment, information related to candidate links is acquired. The candidate links include a cellular link to another cell and a relay link via another relay equipment.

In step S220, a communication link to be applied to the user equipment is selected from the candidate links based on the information.

The above embodiments may be used to a case, for example, that the remote UE satisfies both the handover and relay reselection. Trigger conditions for such events may be defined.

The UE-to-Network reselection condition defined in LTE include that a SD-RSRP measurement result of the current relay UE is lower than q-RxLevMin in reselectionInfoIC (within the coverage) or reselectionInfoOoC (outside of the coverage); or higher layer signaling indicates that the current relay UE is not to be used anymore.

Since sidelink discovery is a best-effort operation, it may happen that the remote UE has not found a suitable relay UE when it meets the instantaneous relay reselection condition. Therefore, a RelayreselectionTimer timer may be set, and the remote UE may perform sidelink discovery in the time of the RelayreselectionTimer to find a candidate relay UE. In a case where no suitable relay UE is found when the timer expires, the remote UE is directly served by the eNB.

Accordingly, the following relay reselection strategy may be defined.

a) When PC5 link measurement (SD-RSRP or S-RSRP) performed by the remote UE for the current relay UE satisfies the above-mentioned instantaneous relay reselection condition, the remote UE starts the RelayreselectionTimer.

b) When the RelayreselectionTimer expires: if the remote UE finds a suitable relay UE, the remote UE performs the relay reselection; if the remote UE still does not find a relay UE that satisfies the condition, the remote UE may only be served by the eNB.

The RelayreselectionTimer is designed for the remote UE to discover the neighbor candidate relay UE, and the timer may be adjusted according to the number of candidate relay UEs that the remote UE has found. The above parameters may be configured by the eNB for the remote UE.

In addition, the A3 event defined in LTE may be used for handover between traditional cells. When the Uu RSRP of the target cell satisfies the entry condition of the A3 event, the Time To Trigger (ITT) timer starts timing, if the leaving condition of the A3 event is not satisfied within the time of the TTT, the A3 event measurement report is triggered.

Figure 11:
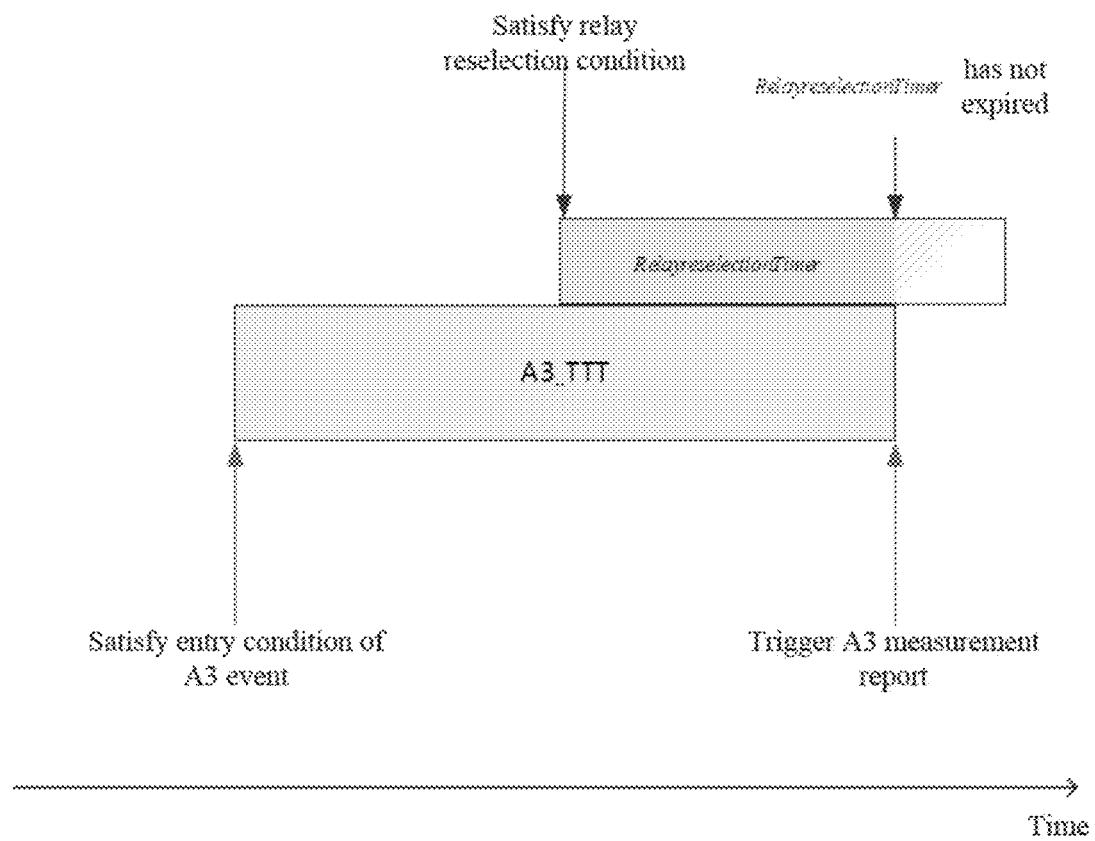
FIG. 11 is a schematic diagram showing example conditions for triggering a link selection strategy.

Accordingly, as shown in FIG. 11, the example trigger condition that the remote UE simultaneously satisfies the A3 event switching and relay reselection is defined as follows.

a) The measurement result of the remote UE indicates that the remote UE satisfies the entry condition of the A3 event, and the instantaneous relay reselection condition is satisfied when the A3_TTT has not expired, the remote UE starts the RelayreselectionTimer.

b) When the A3_TTT expires, the measurement result of the remote UE indicates that the remote UE does not satisfy the leaving condition of the A3 event, and the RelayreselectionTimer configured by the remote UE has not expired.

It should be noted that the duration relationship between A3_TTT and RelayreselectionTimer may be arbitrarily set as needed. In addition, RelayreselectionTimer may also be started earlier than A3_TTT.

In the above example case, when the A3 event measurement report is triggered, the remote UE is still looking for the candidate relay UE, that is, still in the event of the relay reselection. In this case, the remote UE may be triggered to perform the link selection strategy previously described with reference to the exemplary embodiment, for example, comparing the optimal candidate relay UE with the neighboring cell Uu link.

Figure 12A:
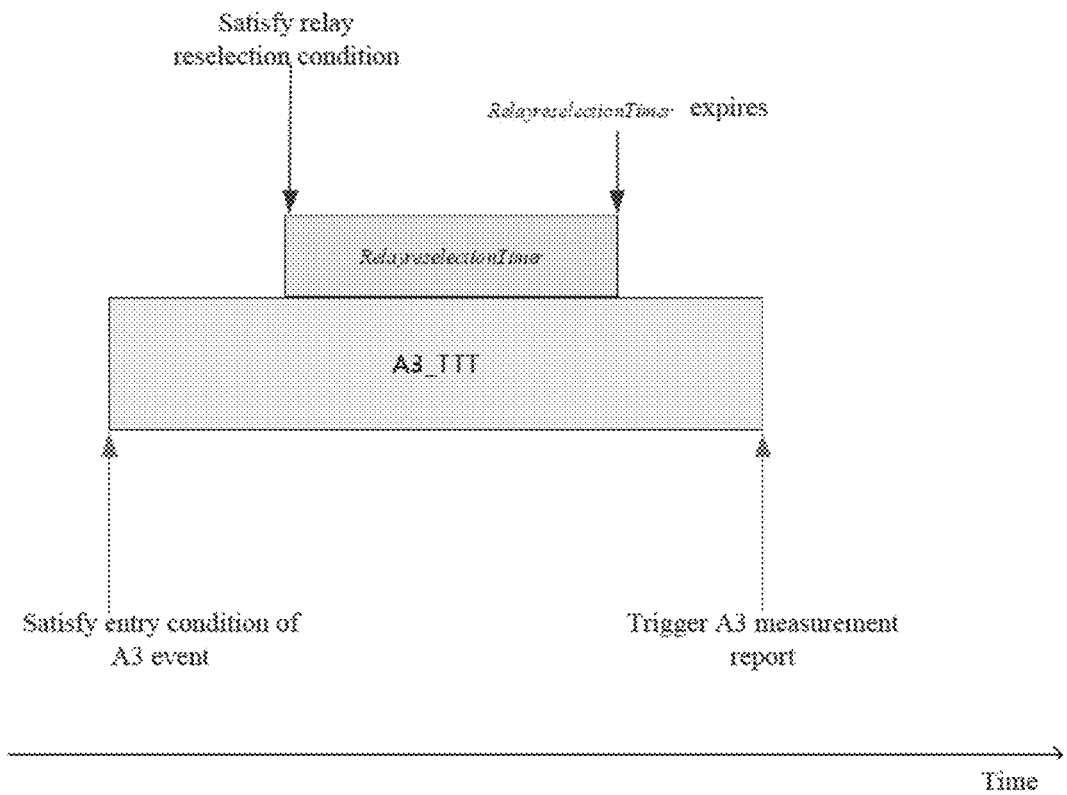
FIG. 12A and FIG. 12B are schematic diagrams showing example conditions for triggering a link selection strategy.
Figure 12B:
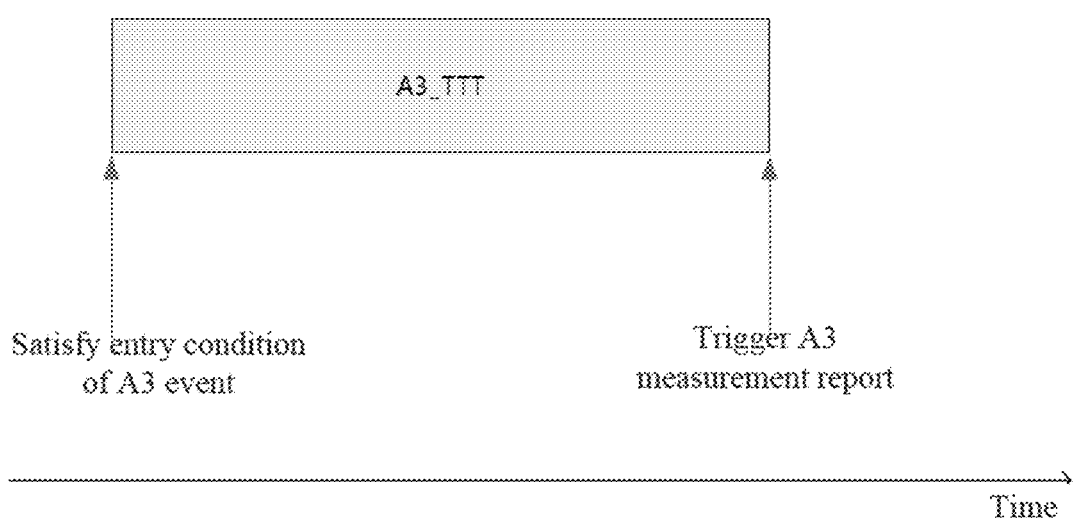

FIG. 12A and FIG. 12B show an example of triggering the remote UE to perform a link selection strategy when the A3_TTT expires and the A3 event measurement report is satisfied. The remote UE does not satisfy the relay reselection condition when the remote UE satisfies the handover condition.

In the case shown in FIG. 12A, before the remote UE satisfies the trigger event for the A3 event measurement report, the relay reselection event has been completed, and a new connection has been established with a new relay UE. FIG. 12B shows that the remote UE is still served by the current relay UE when the remote UE satisfies the trigger event for the A3 event measurement report. In the above case, the remote UE may be triggered to perform a link selection strategy, for example, comparing the PC5 link of the currently connected relay UE with the neighboring cell Uu link.

The Uu link measurement and the PC5 link measurement in FIG. 11, FIG. 12A and FIG. 12B may be performed independently, and the duration and sequences of the A3_TTT and RelayreselectionTimer are not limited to the illustrated examples.

Figure 13A:
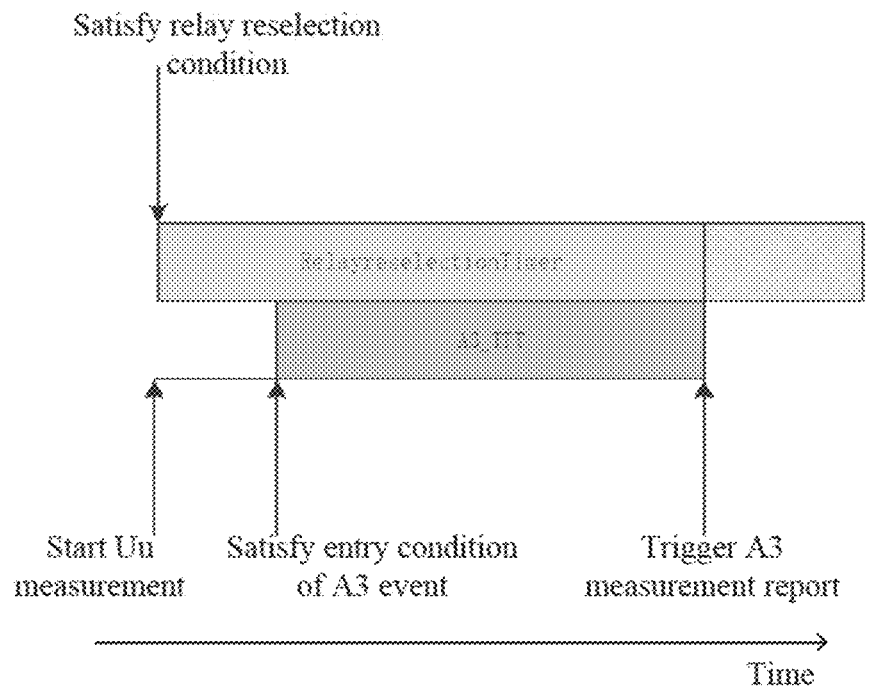
FIG. 13A and FIG. 13B are schematic diagrams showing example cases of triggering a measurement for a Uu link when a relay reselection condition is satisfied.
Figure 13B:
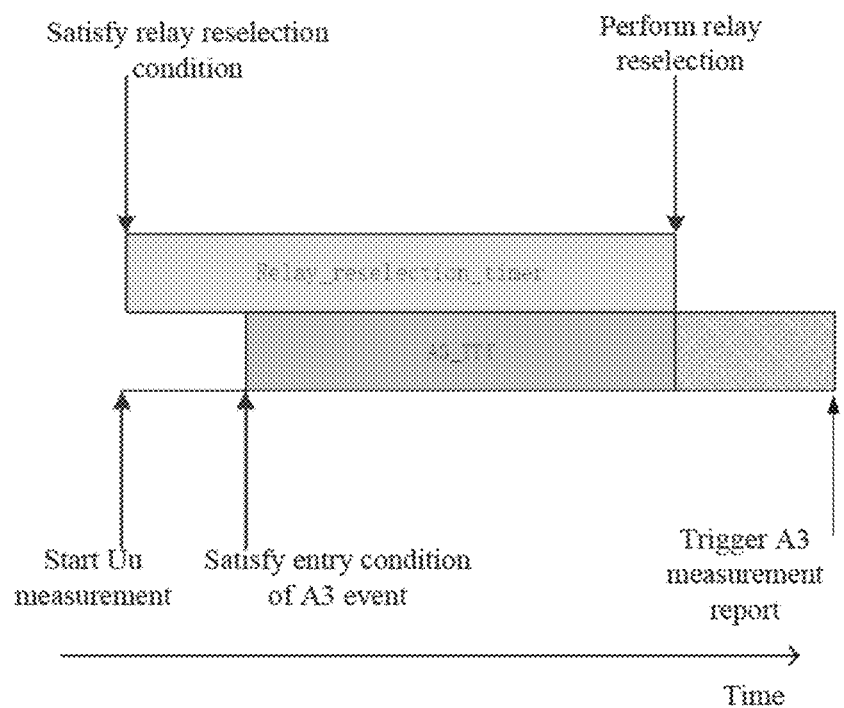

In addition, FIG. 13A and FIG. 13B illustrate an example case where the remote UE triggers the Uu link measurement in a case where the remote UE satisfies the relay reselection condition. During time of RelayreselectionTimer, the remote UE starts the Uu link measurement.

In the case shown in FIG. 13A, before the expiration of the RelayreselectionTimer, the A3 event measurement report is satisfied, and at this time, link selection may be performed (similar to the case described above with reference to FIG. 11).

In the case shown in FIG. 13B, when RelayreselectionTimer expires, the A3 event measurement report is not satisfied, and the remote UE may first perform relay selection according to the obtained information of candidate relay UE. Next, when A3_TTT expires, if the A3 event measurement report is satisfied, the PC5 link of the currently connected relay UE may be compared with the neighboring cell Uu link, similar to the case described above with reference to FIG. 12A.

The previous embodiments related to the path switching determination involve the triggering condition of the path switching determination process. According to another aspect of the present disclosure, a scheme for triggering the link measurement based on a predetermined condition is provided.

Figure 3:
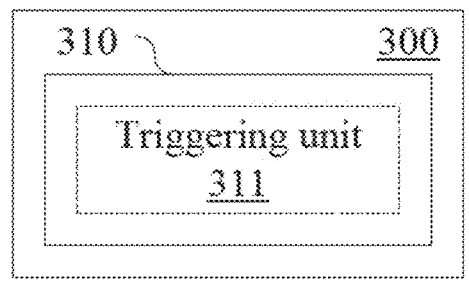
FIG. 3 is a block diagram showing a configuration example of an electronic device for wireless communication according to another embodiment of the present disclosure.

As shown in FIG. 3, an electronic device 300 for wireless communication according to an embodiment includes a processing circuitry 310. The processing circuitry 310 includes a triggering unit 311 configured to: when a quality of a relay link between a user equipment and a current relay equipment is decreased to a predetermined level, trigger the user equipment to perform a link measurement including a measurement on a cellular link between the user equipment and a neighboring cell.

In addition, the link measurement may also include a measurement on a relay link between the user equipment and another relay equipment.

For example, the user equipment corresponds to the aforementioned remote UE, the current relay equipment corresponds to a relay UE that establishes a relay connection with the remote UE, and the another relay equipment corresponds to the candidate relay UE.

Figure 4:
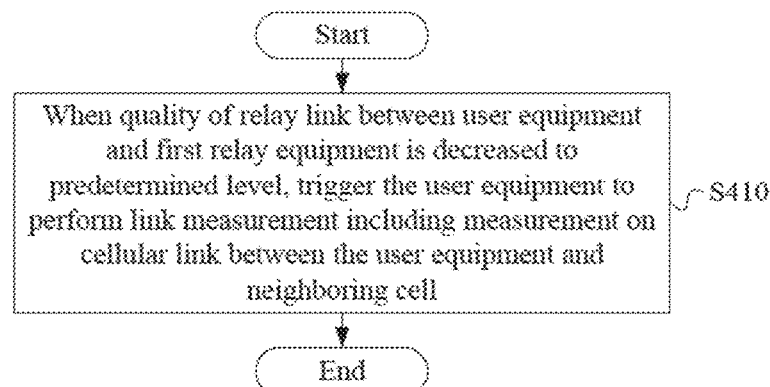
FIG. 4 is a flowchart showing a process example of a wireless communication method according to another embodiment of the present disclosure.

FIG. 4 shows a wireless communication method according to a respective embodiment. The wireless communication method includes:

S410, when a quality of a relay link between a user equipment and a first relay equipment is decreased to a predetermined level, triggering the user equipment to perform a link measurement including a measurement on a cellular link between the user equipment and a neighboring cell.

Further, according to an embodiment of another aspect of the present disclosure, a measurement configuration for a candidate link may be adjusted based on a link state.

Figure 5:
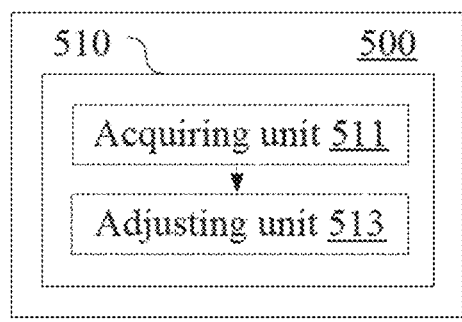
FIG. 5 is a block diagram showing a configuration example of an electronic device for wireless communication according to yet another embodiment of the present disclosure.

FIG. 5 shows an electronic device 500 for wireless communication including a processing circuitry 510 according to the present embodiment. The processing circuitry 510 includes an acquiring unit 511 and an adjusting unit 513.

The acquiring unit 511 is configured to: in a case where a user equipment obtains a communication service from a current cell via a current relay equipment, acquire information related to a state of a link between the user equipment and the current relay equipment and a state of a link between the current relay equipment and the current cell.

The adjusting unit 513 is configured to adjust, based on the information acquired by the acquiring unit 511, a measurement configuration of the user equipment with regard to candidate links. The candidate links include a cellular link to the current cell or another cell and a relay link via another relay equipment.

The above adjustment of the measurement configuration may be triggered when a resource of the user equipment for a relay link measurement conflict with a resource of the user equipment for a cellular link measurement.

After the Remote UE establishes a connection with the relay UE, it is required to measure the quality of the Uu link and the quality of the PC5 link. If the remote UE has two receiving links, two measurements may be performed simultaneously. If the remote UE has only one receiving link, measurement of the quality of only one link may be performed. Therefore, in a case where the remote UE has only one receiving link, if the sidelink measurement configuration is configured by the relay UE, since the Uu link measurement configuration is configured by the eNB, there may be a case where the Uu link measurement conflicts with the sidelink measurement. Therefore, when the remote UE finds out that the two measurements conflict with each other, it needs to request the relay UE or the eNB for a measurement change.

Figure 14A:
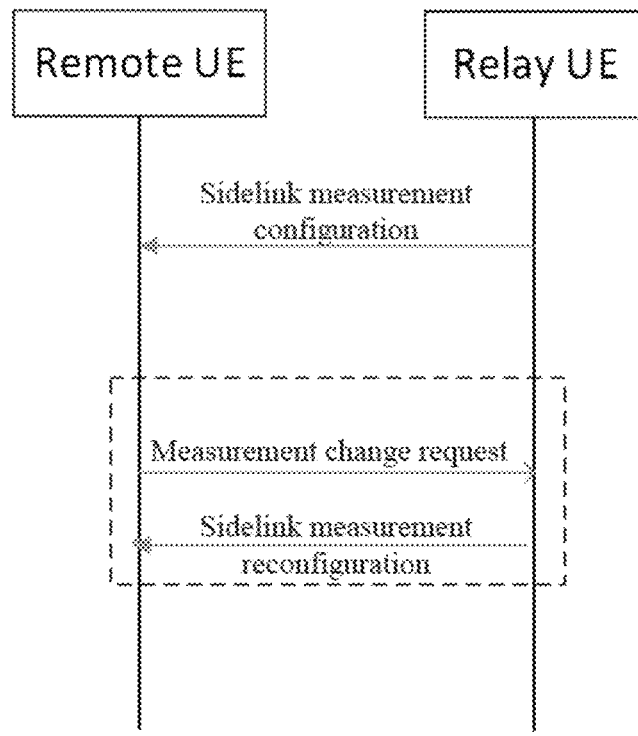
FIG. 14A, FIG. 14B, FIG. 14C and FIG. 14D are schematic diagrams showing example manners of changing a sidelink measurement configuration.
Figure 14B:
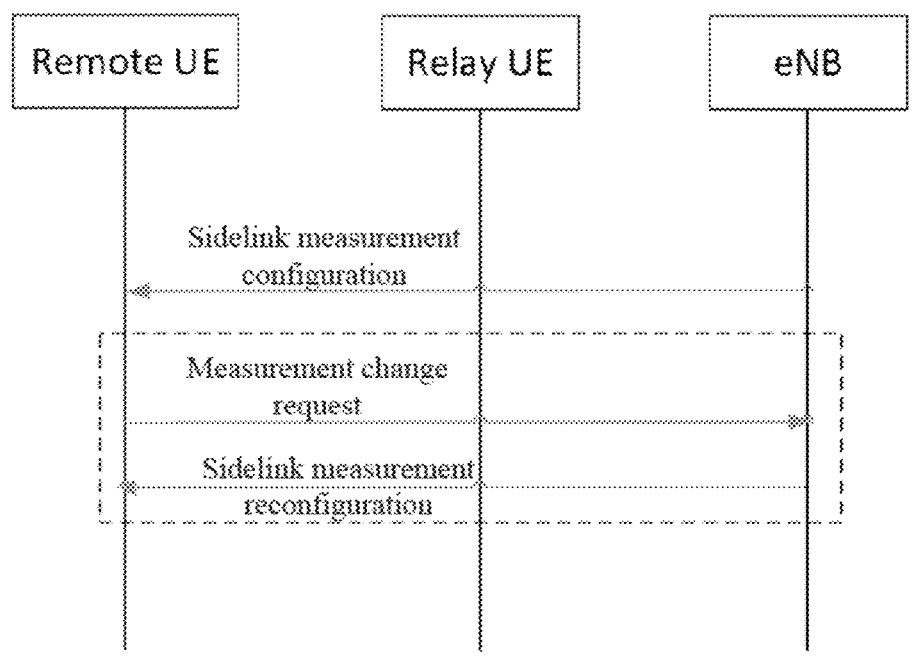
Figure 14C:
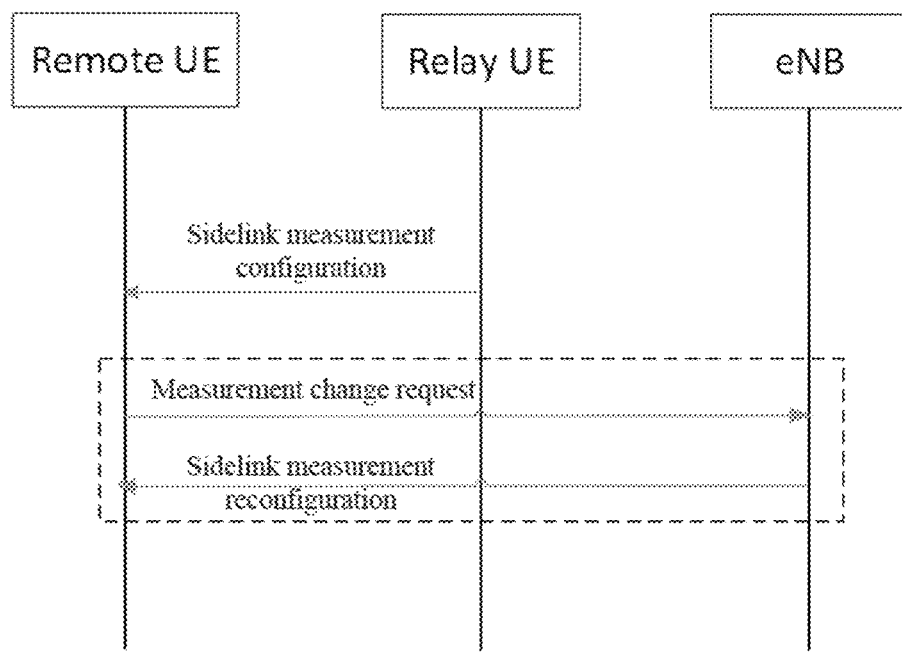
Figure 14D:
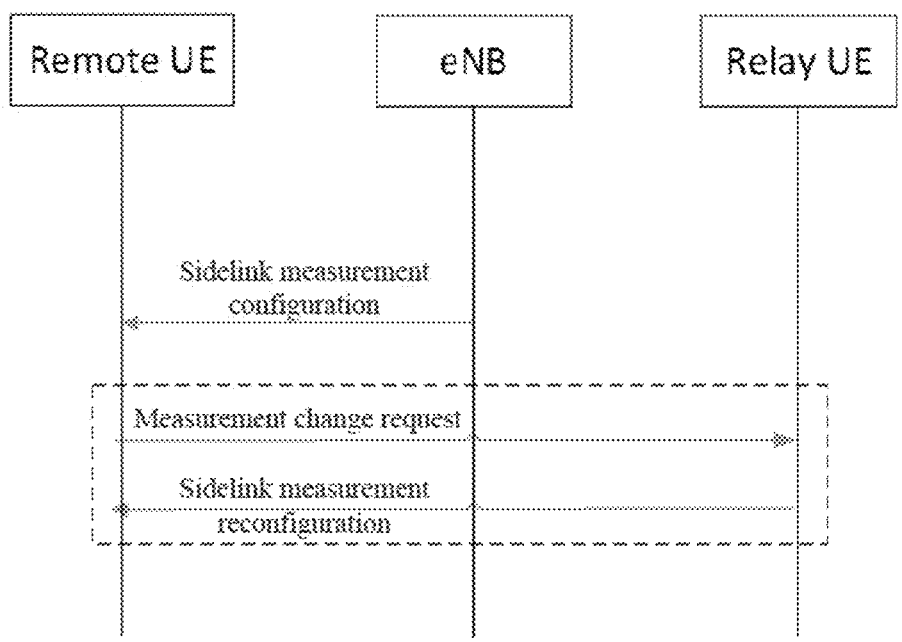

A specific example flow of a measurement configuration and a measurement change request is shown in FIG. 14A to FIG. 14D. FIG. 14A shows an example case where the relay UE performs a sidelink measurement configuration and the remote UE requests the relay UE for a measurement change. FIG. 14B shows an example case where the eNB performs a sidelink measurement configuration and the remote UE requests the eNB for a measurement change. FIG. 14C shows an example case where the relay UE performs a sidelink measurement configuration and the remote UE requests the eNB for a measurement change. FIG. 14D shows an example case where the eNB performs a sidelink measurement configuration and the remote UE requests the relay UE for a measurement change.

Next, the Uu link measurement and the PC5 link measurement are further described.

After the remote UE establishes a connection with a relay UE, it is required to measure the PC5 link of the relay UE. The qualities of the PC5 links of other candidate relay UEs may be measured. The existing measurements for the relay selection and the relay reselection are decided by SD-RSRP, that is, decided by the signal quality in D2D discovery. However, as mentioned in the description of the previous embodiments, both S-RSRP and SD-RSRP can characterize the quality of the PC5 link. Accordingly, according to an embodiment, the quality of the relay link may be characterized by S-RSRP or SD-RSRP.

In addition, as described above, the Remote UE may be a bandwidth-limited remote UE (eMTC UE or NB-IoT UE), that is, the operation bandwidth is, for example, only 6PRB or 1PRB. In addition, sidelink communication and discovery may occur on different narrowbands (6PRB or 1PRB). When the remote UE measures the SD-RSRP, the remote UE cannot perform sidelink communication in the same subframe. When the remote UE measures the S-RSRP, the remote UE cannot perform sidelink discovery in the same subframe. Therefore, the relay UE may configure the sidelink measurement configuration for the remote UE to avoid conflict between the measurement and operations on the sidelink. In order to reduce the power consumption of the remote UE in measurement, a measurement cycle may be adjusted based on the quality of the PC5 link of the selected relay UE. Therefore, a PC5 link measurement method configured by a relay UE is provided here.

When the remote UE establishes a connection with the relay UE, the relay UE or the eNB configures a sidelink measurement configuration for the remote UE based on the quality of the current PC5 link, and the remote UE measures the current PC5 link and other candidate PC5 links according to the sidelink measurement configuration. The Sidelink measurement configuration is decided by an interval period, a sub-frame bitmap, and the like.

After the remote UE establishes a connection with a relay UE of the cell A, the remote UE may be regarded as being in a linked state, the qualities of the Uu links of the current serving cell and the neighboring cell needs to be measured. In order to enable the eNB to reasonably decide whether the remote UE in the link state is to perform the handover or the relay reselection, some additional information needs to be obtained. The additional information may include, for example, whether the target cell supports the UE-to-Network Relay and a threshold configured by the target cell for the remote UE. If the system information of the target cell B does not include SIB18 or SIB19 (SystemInformationBlock18, SystemInformationBlock19, which are used to carry the system information of the D2D communication and the D2D discovery, respectively), it may be regarded that the target cell B does not support the UE-to-Network Relay. The threshHigh in the remoteUE-Config in the SIB19 represents the threshold condition of the remote UE. When the Uu link quality (RSRP) of the cell in which the remote UE is located exceeds the threshHigh, it indicates that the remote UE cannot seek the help of the relay UE. Therefore, in order to obtain the additional information, the remote UE may read the neighbor cell system information when performing the measurement or the additional information may be provided by the eNB. Since the remote UE reading the neighbor cell system information is not conducive to energy saving, a Uu link measurement method is provided here.

Figure 15:
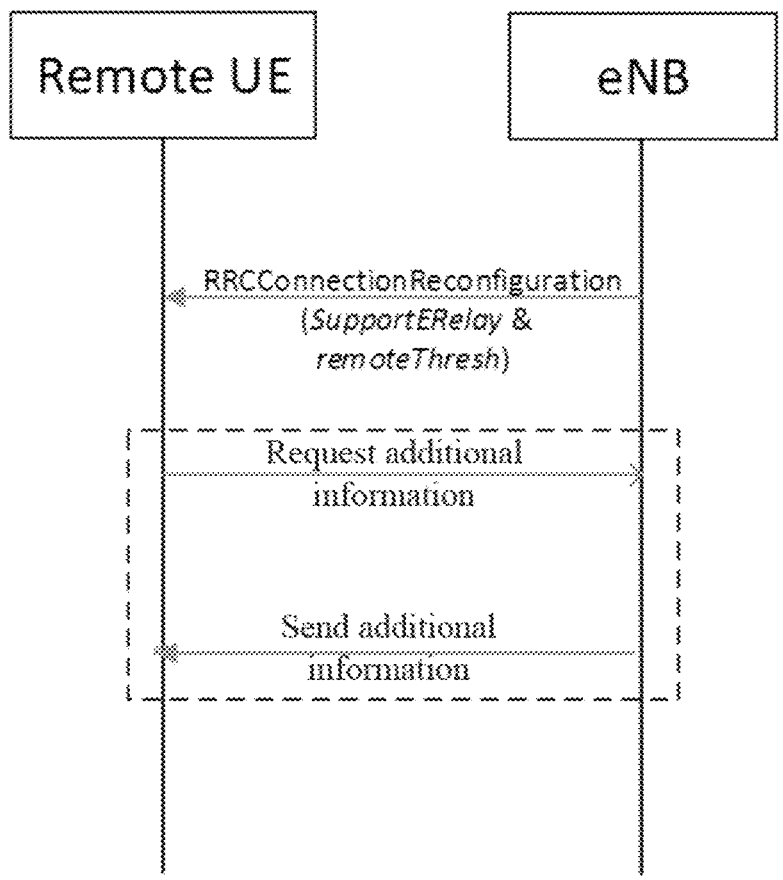
FIG. 15 is a schematic diagram showing an example manner of a measurement configuration for a Uu link.

The specific process is shown in FIG. 15. When the eNB informs the remote UE of the measurement configuration message by using the measConfig cell carried in the RRC-ConnectionReconfiguration message, in the cell table, SupportERelay (1 bit) is additionally used to indicate whether the cell supports the UE-to-Network Relay, "1" indicates that the cell supports the UE-to-Network Relay, and "0" indicates that the cell does not support the UE-to-Network Relay. In addition, remoteThresh needs to be used to inform the cell of the threshold condition configured for the remote UE.

In a case where the cell measured by the remote UE has not been provided by the eNB with SupportERelay and remoteThresh, the remote UE may read the cell system information to obtain SupportERelay and remoteThresh, or request the eNB for SupportERelay and remote Thresh.

Next, a specific embodiment of adjusting the measurement configuration of the user equipment for the candidate link based on the acquired information is described.

According to an embodiment, the adjusting unit 513 is configured to:

reduce relay link measurements for candidate relay equipments in a case where a quality of a relay link between the user equipment and the current relay equipment and a quality of a cellular link between the current relay equipment and the current cell are higher than respective predetermined levels; and increase relay link measurements for candidate relay equipments in a case where a quality of a relay link between the user equipment and the current relay equipment and/or a quality of a cellular link between the current relay equipment and the current cell are lower than respective predetermined levels.

According to another embodiment, the adjusting unit 513 is configured to:

turn off a cellular link measurement of the user equipment with regard to the current cell or another cell or increase a cycle of the cellular link measurement, in a case where a quality of a relay link between the user equipment and the current relay equipment and a quality of a cellular link between the current relay equipment and the current cell are higher than respective predetermined levels; and turn on a cellular link measurement of the user equipment with regard to the current cell or another cell or decrease a cycle of the cellular link measurement, in a case where a quality of a relay link between the user equipment and the current relay equipment and/or a quality of a cellular link between the current relay equipment and the current cell are lower than respective predetermined levels.

According to yet another embodiment, the adjusting unit 513 is configured to:

turn off a cellular link measurement of the user equipment with regard to the current cell or another cell or increase a cycle of the cellular link measurement, in a case where the number of candidate relay equipments discovered by the user equipment within a predetermined time is larger than a predetermined threshold; and turn on a cellular link measurement of the user equipment with regard to the current cell or another cell or decrease a cycle of the cellular link measurement, in a case where the number of candidate relay equipments discovered by the user equipment within a predetermined time is less than a predetermined threshold.

In addition to the link quality indicators previously described, the quality of the relay link and the quality of the cellular link may include link stabilities characterized by respective link change rates.

Next, a detailed description will be given in conjunction with specific examples.

The remote UE connected to the relay UE can change the measurement configuration for the Uu link and the PC5 link based on the state of the Uu link and the PC5 link. For example, when the PC5 link between the remote UE and the relay UE is stable and the link between the relay UE and the base station is relatively stable, the remote UE may decrease the cycle of the PC5 link measurement and the Uu link measurement to save energy.

The PC5 link stability condition may be defined as follows: the measurement result of the remote UE indicates that the PC5 link change rate is less than a certain threshold $Thr_{PC5}$:

entry condition: $\Delta PC5+Hys1<Thr_{PC5}$;

leaving condition: $\Delta PC5-Hys1>Thr_{PC5}$.

The PC5 link instability condition may be defined as follows: the measurement result of the remote UE indicates that the PC5 link change rate is greater than a certain threshold $Thr_{PC5}$;

entry condition: $\Delta PC5-Hys1>Thr_{PC5}$;

leaving condition: $\Delta PC5+Hys1<Thr_{PC5}$.

The Uu link stability condition may be defined as follows: the measurement result of the UE indicates that the Uu link change rate is less than a certain threshold $Thr_{Uu}$;

entry condition: $\Delta PC5+Hys2<Thr_{Uu}$;

leaving condition: $\Delta PC5-Hys2>Thr_{Uu}$.

The Uu link instability condition may be defined as follows: the measurement result of the UE indicates that the Uu link change rate is greater than a certain threshold $Thr_{Uu}$;

entry condition: $\Delta PC5-Hys2>Thr_{Uu}$;

leaving condition: $\Delta PC5+Hys2<Thr_{Uu}$.

The Uu stability indicator may be defined as follows. The Uu link state may be broadcast by the UE. '0' indicates that the UE Uu link is in an unstable state, and '1' indicates that the relay UE Uu link is in a stable state. The eNB may obtain the above indicator by calculating based on the measurement report of the user.

In the above example, Hys represents a hysteresis amount.

Next, an example of an adaptive measurement configuration method for a PC5 link will be described with reference to FIG. 16A and FIG. 16B.

Figure 16A:
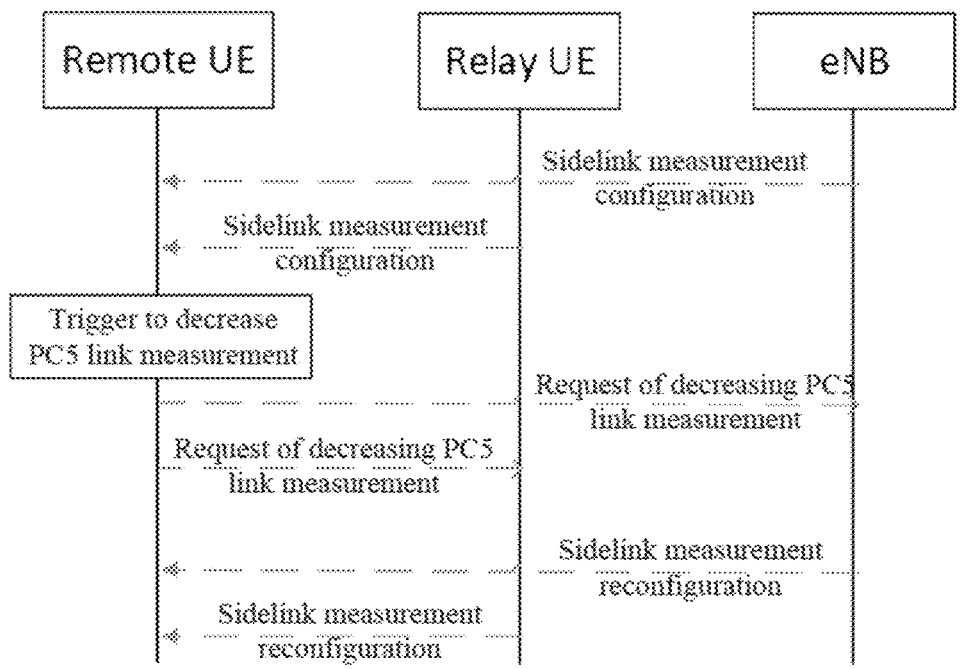
FIG. 16A and FIG. 16B are schematic diagrams showing exemplary manners of an adaptive measurement for a PC5 link.

FIG. 16A shows an example process of decreasing the PC5 link measurement.

Trigger event: when the measurement result of the remote UE indicates that the PC5 link is stable and the Uu link stability indicator of the connected relay UE indicates that the relay UE Uu link is in a stable state, it indicates that the connection between the remote UE and the relay UE is stable, the remote UE may request the relay UE/eNB to decrease the PC5 link measurement configuration, such as increasing a cycle of the PC5 link measurement, changing the sub-frame bitmap of the measurement, and the like.

Figure 16B:
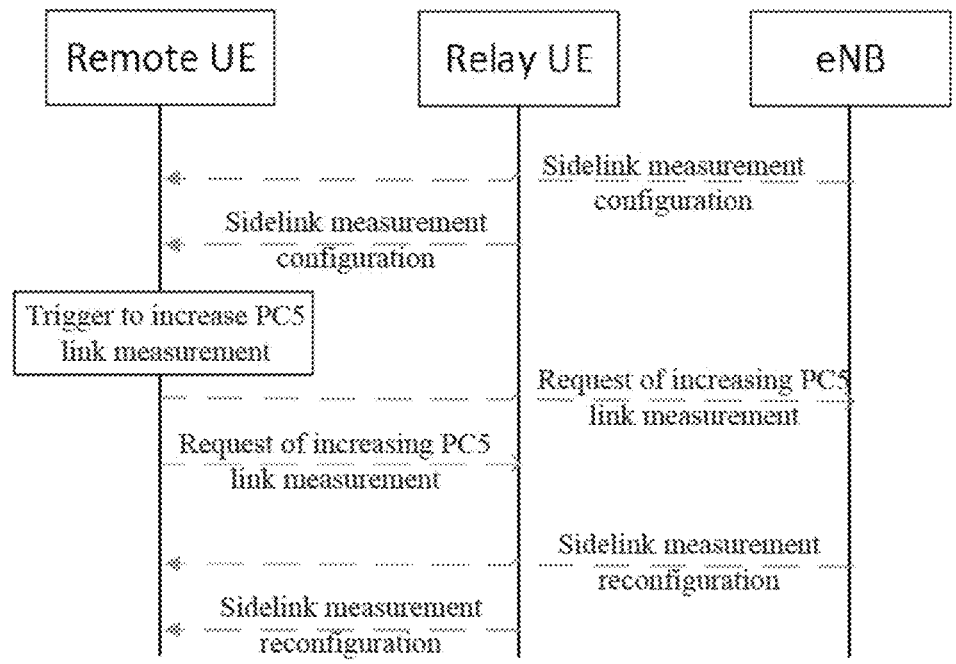

FIG. 16B shows an example process of increasing the PC5 link measurement.

Trigger event: in a case where the measurement result of the remote UE indicates that the PC5 link is unstable or the Uu link stability indicator of the connected relay UE indicates that the relay UE Uu link is in a unstable state, it indicates that the remote UE is likely to perform the relay reselection/link switching, the remote UE may request the relay UE/eNB to increase the PC5 link measurement configuration, such as decreasing a cycle of the PC5 link measurement, changing the sub-frame bitmap of the measurement, and the like.

Next, an example of an adaptive measurement configuration method for a Uu link will be described with reference to FIG. 17A and FIG. 17B.

Figure 17A:
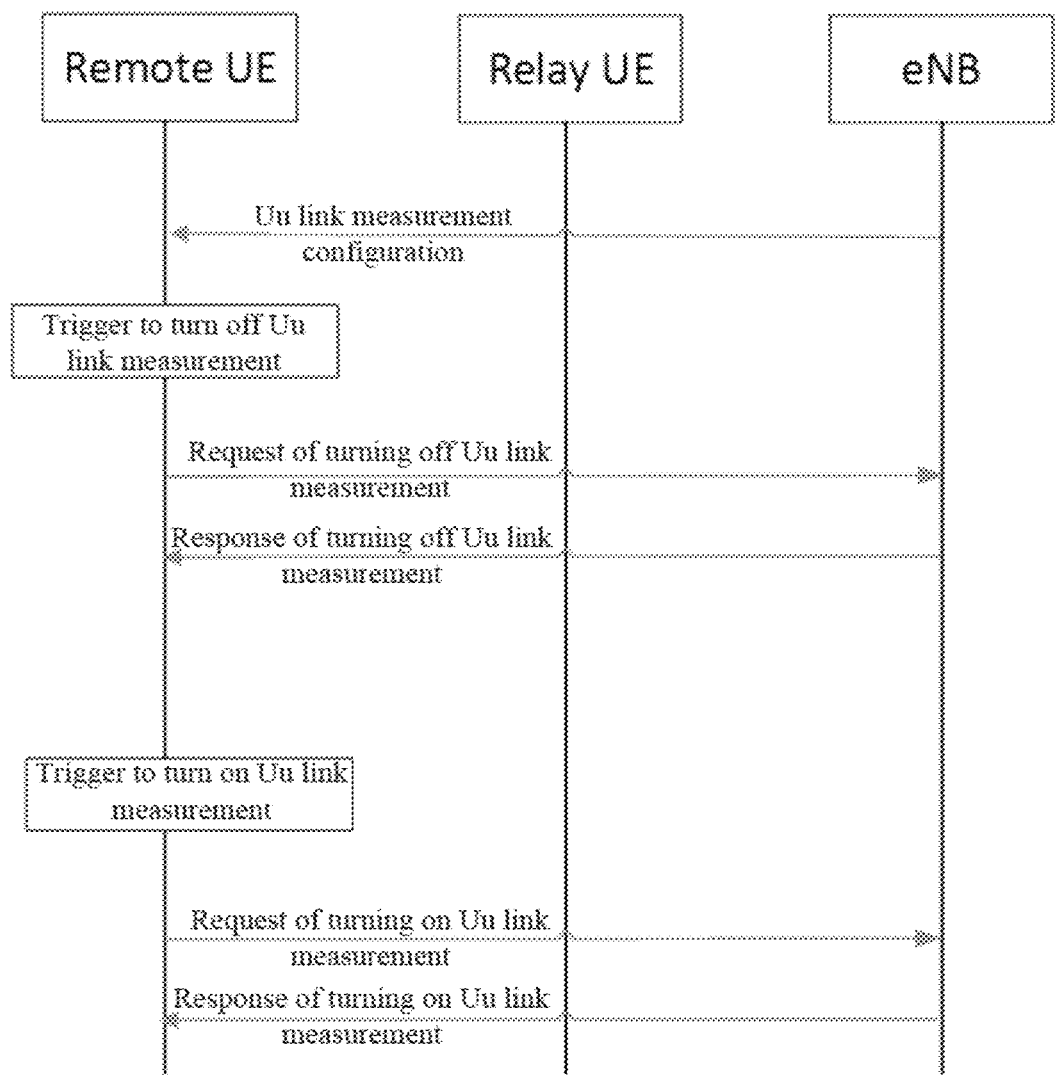
FIG. 17A and FIG. 17B are schematic diagrams showing exemplary manners of an adaptive measurement for a Uu link.

FIG. 17A shows an example manner of turning on/off the Uu link measurement.

Turning off the Uu link measurement

Trigger event 1: in a case where the measurement result of the remote UE indicates that the PC5 link is stable and the Uu link stability indicator of the connected relay UE indicates that the relay UE Uu link is in a stable state, it indicates that the connection between the remote UE and the relay UE is stable, the remote UE may request the eNB to turn off the Uu link measurement.

Triggering event 2: in a case where the number of candidate relay UEs discovered by the remote UE in a period of time reaches a certain threshold, it indicates that the remote UE can connect with other relay UEs even if the remote UE cannot continue to connect with the current relay UE, the remote UE may request the eNB to turn off the Uu link measurement.

Turning on the Uu link measurement

Trigger event 1: in a case where n the measurement result of the remote UE indicates that the PC5 link is unstable or the Uu link stability indicator of the connected relay UE indicates that the relay UE Uu link is in a unstable state, it indicates that the remote UE is likely to perform the relay reselection/link switching, therefore, the remote UE should request the eNB to turn on the Uu link measurement.

Triggering event 2: in a case where the number of candidate relay UEs discovered by the remote UE is less than a certain threshold, it indicates that the remote UE cannot connect with a relay UE and needs to connect with the base station when the remote UE performs the link switching, therefore, the remote UE should request the eNB to turn on the Uu link measurement.

Figure 17B:
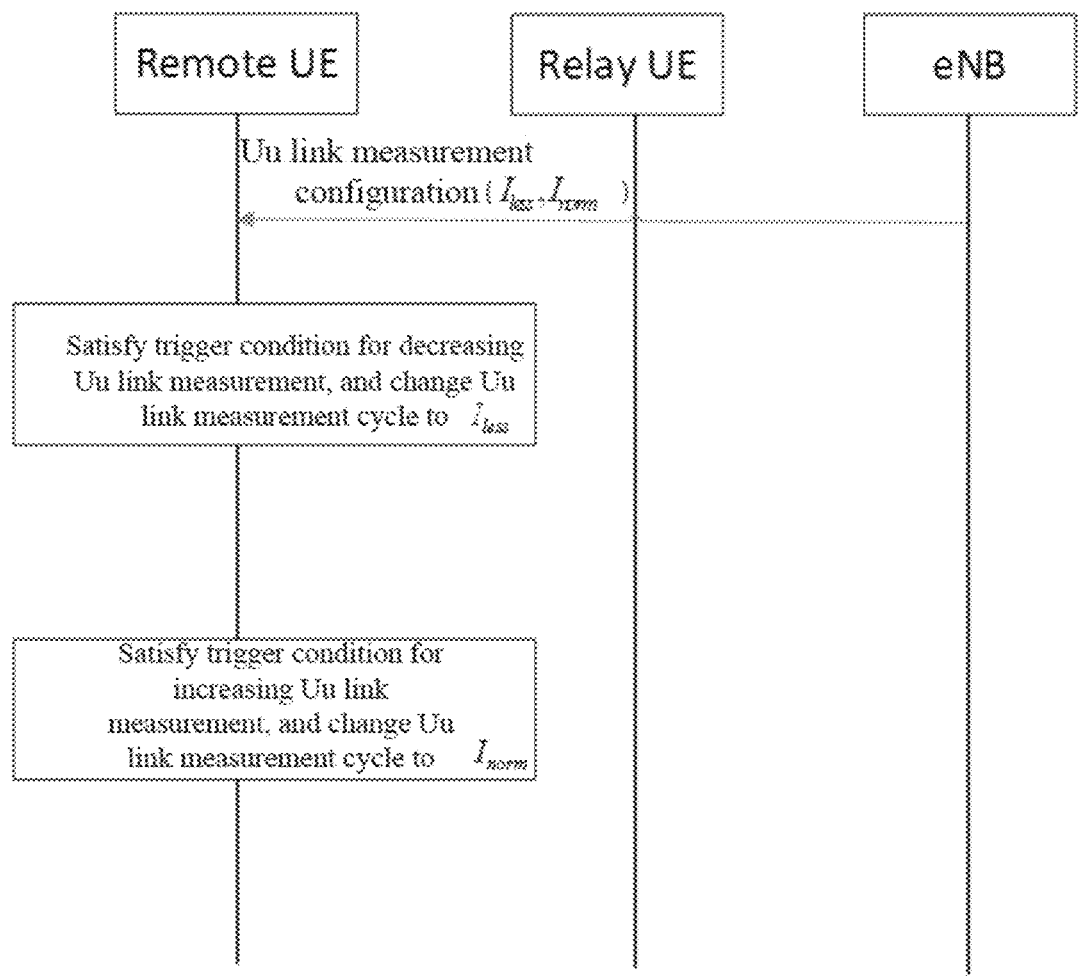

FIG. 17B shows an example manner of adjusting the Uu link measurement.

When the eNB configures the Uu link measurement for the remote UE, the eNB may configure multiple measurement cycles, such as $I_{less}$, $I_{norm}(I_{norm}>I_{less})$, for the remote UE. The remote UE may switch the measurement cycle based on the PC5 link state and the connected relay UE Uu link state.

It is assumed that the Uu link measurement cycle configured by the eNB for the remote UE is an initial measurement cycle $I_{norm}$: when the remote UE finds that the trigger event (1, 2) defined in above process of decreasing the Uu link measurement is satisfied, the remote UE uses $I_{less}$ as the measurement cycle; when the remote UE finds that the trigger event (1, 2) defined in above process of increasing the Uu link measurement is satisfied, the remote UE uses $I_{norm}$ as the measurement cycle.

The above exemplary manner may provide, for example, the following advantageous effects. With the measurement configuration for the PC5 link, the power consumption of the remote UE in measuring the PC5 link can be reduced, and the conflict between the sidelink communication and the measurement can be avoided. With the measurement configuration of the eNB for the remote UE, it may be predicted whether the remote UE can obtain a better service after the handover. According to the state of the PC5 link and the relay UE Uu link, the strategy of the remote UE PC5 link measurement and the Uu link measurement can be effectively adjusted, thereby reducing the energy consumption of the remote UE in the measurement.

Figure 6:
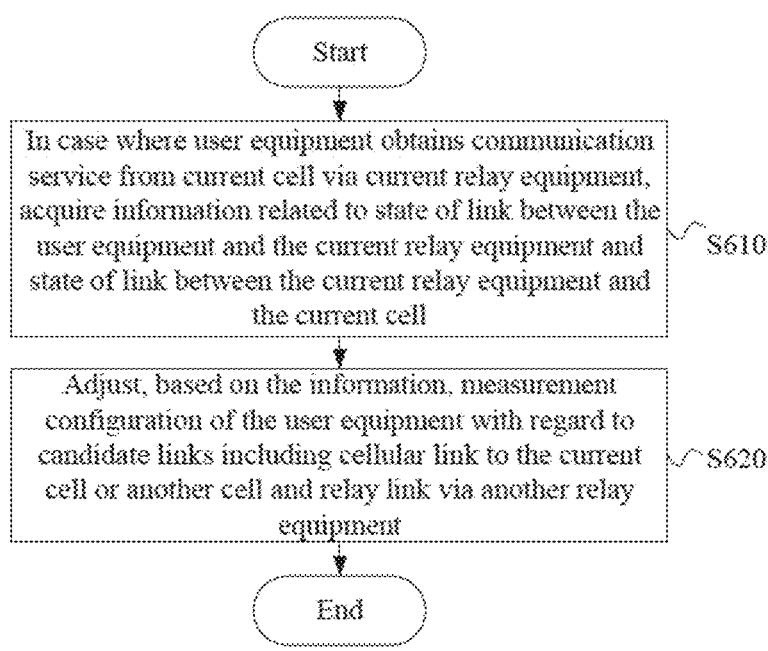
FIG. 6 is a flowchart showing a process example of a wireless communication method according to yet another embodiment of the present disclosure.

As shown in FIG. 6, the wireless communication method according to the present embodiment includes the following steps.

In step S610, in a case where a user equipment obtains a communication service from a current cell via a current relay equipment, information related to a state of a link between the user equipment and the current relay equipment and a state of a link between the current relay equipment and the current cell is acquired.

In step S620, a measurement configuration of the user equipment with regard to candidate links is adjusted based on the information. The candidate links include a cellular link to the current cell or another cell and a relay link via another relay equipment.

As an example, various steps of the methods above and various modules and/or units of the apparatuses above may be implemented as software, firmware, hardware or a combination thereof. In a case of implementing by software or firmware, programs consisting of the software for implementing the methods above are installed to a computer with a dedicated hardware structure (for example a general-purpose computer 2000 shown in FIG. 18) from the storage medium or the network. The computer can perform various types of functions when installed with various types of programs.

Figure 18:
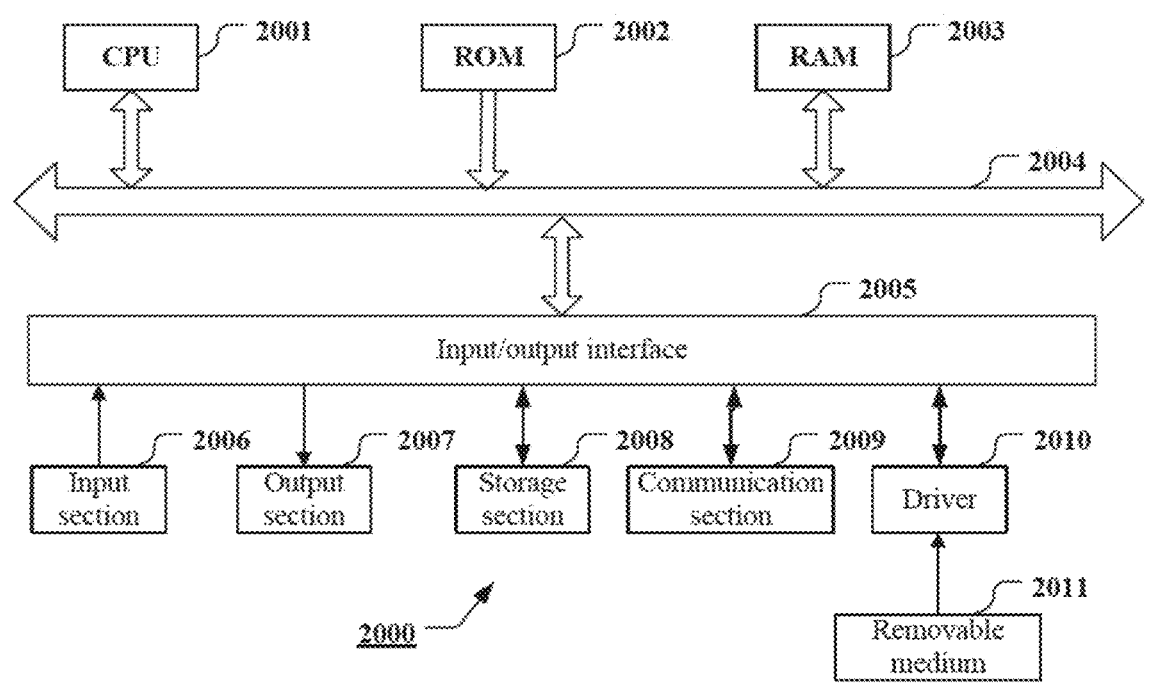
FIG. 18 is a block diagram showing an exemplary structure of a computer for implementing the method and device according to the present disclosure.

In FIG. 18, a central processing unit (CPU) 2001 performs various types of processing according to programs stored in a read only memory (ROM) 2002 or programs loaded from a storage section 2008 to a random access memory (RAM) 2003. Data required when the CPU 2001 performs various types of processing is also stored in the RAM 2003 as needed. The CPU 2001, the ROM 2002 and the RAM 2003 are linked to each other via a bus 2004. An input/output interface 2005 is also linked to the bus 2004.

The following components are linked to the input/output interface 2005: an input section 2006 (including a keyboard, and a mouse and so on), an output section 2007 (including a display, for example a cathode ray tube (CRT) and a liquid crystal display (LCD), and a loudspeaker), a storage section 2008 (including a hard disk and so on), and a communication section 2009 (including a network interface card for example a LAN card, and a modem). The communication section 2009 performs communication processing via a network for example the Internet. A driver 2010 may also be linked to the input/output interface 2005 as needed. A removable medium 2011 for example a magnetic disk, an optical disk, a magnetic-optical disk and a semiconductor memory may be installed on the driver 2010 as needed, such that computer programs read from the removable medium 2011 are installed on the storage section 2008 as needed.

In a case of performing the series of processing described above by software, programs consisting of the software are installed from the network for example the Internet or the storage medium for example the removable medium 2011.

Those skilled in the art should understand that the storage medium is not limited to the removable medium 2011 shown in FIG. 18 which stores programs and is distributed separately from the device to provide the programs to the user. Examples of the removable medium 2011 include: a magnetic disk (including a floppy disk (registered trademark), an optical disk (including a compact disk read only memory (CD-ROM) and a digital versatile disk (DVD)), a magnetic-optical disk (including a mini disk (MD) (registered trademark)), and a semiconductor memory. Alternatively, the storage medium may be a hard disk included in the ROM 2002 and the storage section 2008 which stores programs. The storage medium and the device including thereof together are distributed to the user.

A program product storing machine readable instruction codes is further provided according to the embodiments of the present disclosure. When read and executed by a machine, the instruction codes cause the machine to perform the method according to the embodiment of the present disclosure.

Accordingly, a storage medium for carrying the program product storing the machine readable instruction codes is further provided according to the present disclosure. The storage medium includes but not limited to a floppy disk, an optical disk, a magnetic-optical disk, a storage card and a memory stick and so on.

The embodiments of the present disclosure further relate to an electronic device in the following. In a case where the electronic device is for base station side, the electronic device may be implemented as any type of evolved node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base stations, such as a NodeB and a base transceiver station (BTS). The electronic device may include: a body configured to control wireless communication (also referred to as a base station device), and one or more remote radio heads (RRH) located at positions different from the body. In addition, various types of terminals described in the following each may function as a base station to operate by performing functions of the base station temporarily or in a semi-permanent manner.

In a case where the electronic device is for user equipment side, the electronic device may be implemented as mobile terminals (such as a smart phone, a tablet personal computer (PC), a notebook PC, a portable game terminal, a portable/dongle mobile router and a digital camera) or a vehicle terminal (such as an automobile navigation device). In addition, the electronic device may be a wireless communication module installed on each of the above terminals (such as an integrated circuit module including one or more chips).

[Application Example of a Terminal Device]

Figure 19:
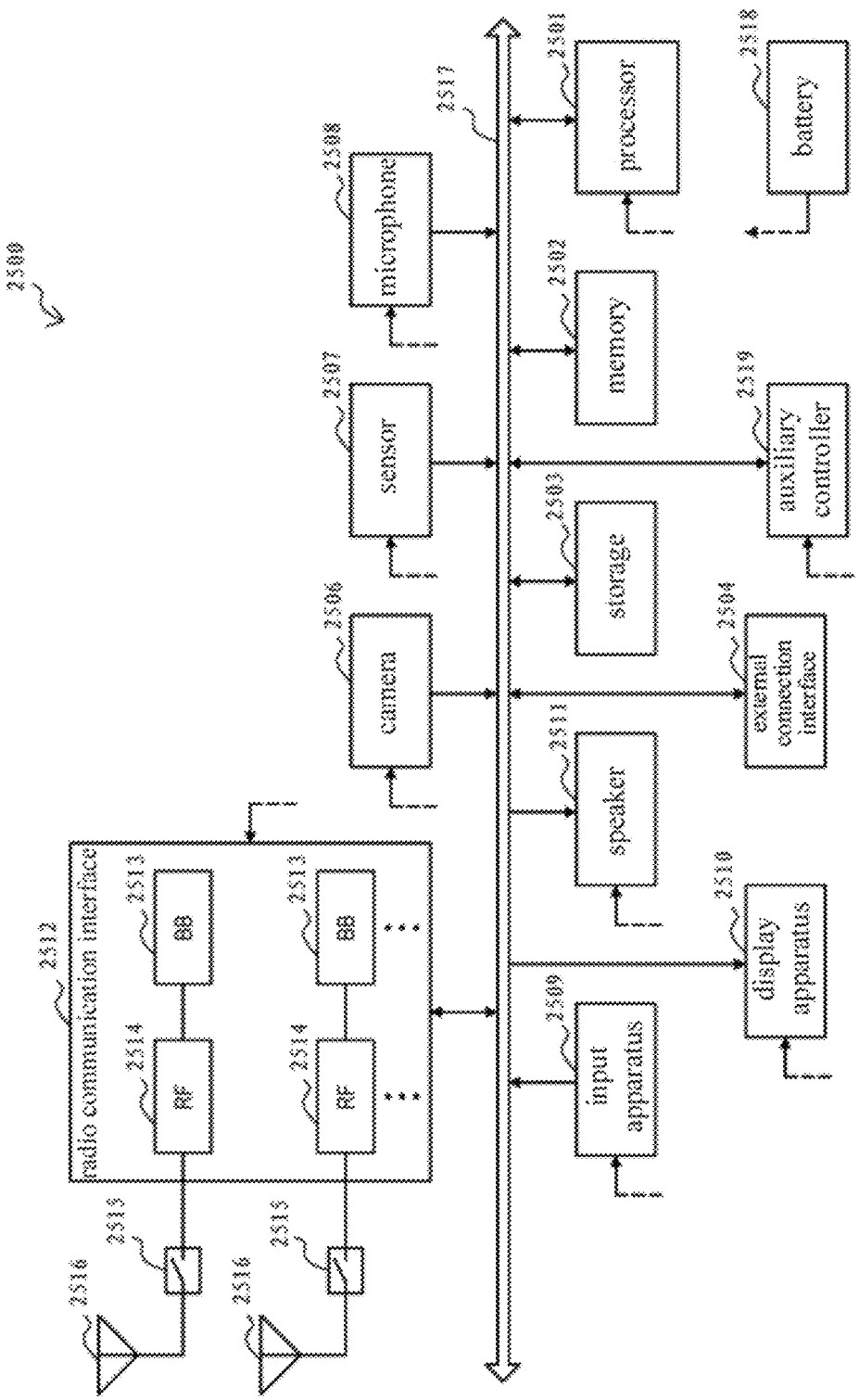
FIG. 19 is a block diagram showing an example of a schematic configuration of a smart phone to which the technology according to the present disclosure may be applied.

FIG. 19 is a block diagram showing an example of a schematic configuration of a smart phone 2500 to which the technology according to the present disclosure may be applied. The smart phone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smart phone 2500. The memory 2502 includes RAM and ROM, and stores a program that is executed by the processor 2501, and data. The storage 2503 may include a storage medium such as a semiconductor memory and a hard disk. The external connection interface 2504 is an interface for connecting an external apparatus such as a memory card and a universal serial bus (USB) apparatus to the smart phone 2500.

The camera 2506 includes an image sensor such as a charge coupled device (CCD) and a complementary metal oxide semiconductor (CMOS), and generates a captured image. The sensor 2507 may include a group of sensors such as a measurement sensor, a gyro sensor, a geomagnetic sensor, and an acceleration sensor. The microphone 2508 converts sounds that are inputted to the smart phone 2500 into audio signals. The input apparatus 2509 includes, for example, a touch sensor configured to detect touch onto a screen of the display apparatus 2510, a keypad, a keyboard, a button, or a switch, and receive an operation or information inputted from a user. The display apparatus 2510 includes a screen such as a liquid crystal display (LCD) and an organic light-emitting diode (OLED) display, and displays an output image of the smart phone 2500. The speaker 2511 converts audio signals that are outputted from the smart phone 2500 into sounds.

The radio communication interface 2512 supports any cellular communication scheme such as LTE and LTE-Advanced, and performs radio communication. The radio communication interface 2512 may typically include, for example, a base band (BB) processor 2513 and a radio frequency (RF) circuit 2514. The BB processor 2513 may perform, for example, encoding/decoding, modulating/demodulating, and multiplexing/demultiplexing, and performs various types of signal processing for radio communication. Meanwhile, the RF circuit 2514 may include, for example, a mixer, a filter, and an amplifier, and transmits and receives radio signals via the antenna 2516. The radio communication interface 2512 may be a chip module having the BB processor 2513 and the RF circuit 2514 integrated thereon. The radio communication interface 2512 may include multiple BB processors 2513 and multiple RF circuits 2514, as illustrated in FIG. 19. Although FIG. 19 illustrates the example in which the radio communication interface 2512 includes the multiple BB processors 2513 and the multiple RF circuits 2514, the radio communication interface 2512 may also include a single BB processor 2513 or a single RF circuit 2514.

Furthermore, in addition to a cellular communication scheme, the radio communication interface 2512 may support another type of radio communication scheme such as a short-distance radio communication scheme, a near field communication scheme, and a radio local area network (LAN) scheme. In this case, the radio communication interface 2512 may include the BB processor 2513 and the RF circuit 2514 for each radio communication scheme.

Each of the antenna switches 2515 switches connection destinations of the antennas 2516 among multiple circuits (such as circuits for different radio communication schemes) included in the radio communication interface 2512.

Each of the antennas 2516 includes a single or multiple antenna elements (such as multiple antenna elements included in an MIMO antenna), and is used for the radio communication interface 2512 to transmit and receive radio signals. The smart phone 2500 may include the multiple antennas 2516, as illustrated in FIG. 19. Although FIG. 19 illustrates the example in which the smart phone 2500 includes the multiple antennas 2516, the smart phone 2500 may also include a single antenna 2516.

Furthermore, the smart phone 2500 may include the antenna 2516 for each radio communication scheme. In this case, the antenna switches 2515 may be omitted from the configuration of the smart phone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512, and the auxiliary controller 2519 to each other. The battery 2518 supplies power to blocks of the smart phone 2500 illustrated in FIG. 19 via feeder lines, which are partially shown as dashed lines in the figure. The auxiliary controller 2519 operates a minimum necessary function of the smart phone 2500, for example, in a sleep mode.

In the smart phone 2500 shown in FIG. 19, at least a part of functions of the processing circuitry of electronic device according to the embodiment of the disclosure may be implemented by the processor 2501 or the auxiliary controller 2519. For example, power consumption of the battery 2518 may be reduced by performing a part of the functions of the processor 2501 by the auxiliary controller 2519. In addition, the processor 2501 or the auxiliary controller 2519 may perform at least a part of the functions of the processing circuitry and/or the units of the electronic device or the wireless communication device at the mobile terminal side according to the embodiment of the disclosure by executing programs stored in the memory 2502 or the storage 2503.

[Application Example of a Base Station]

Figure 20:
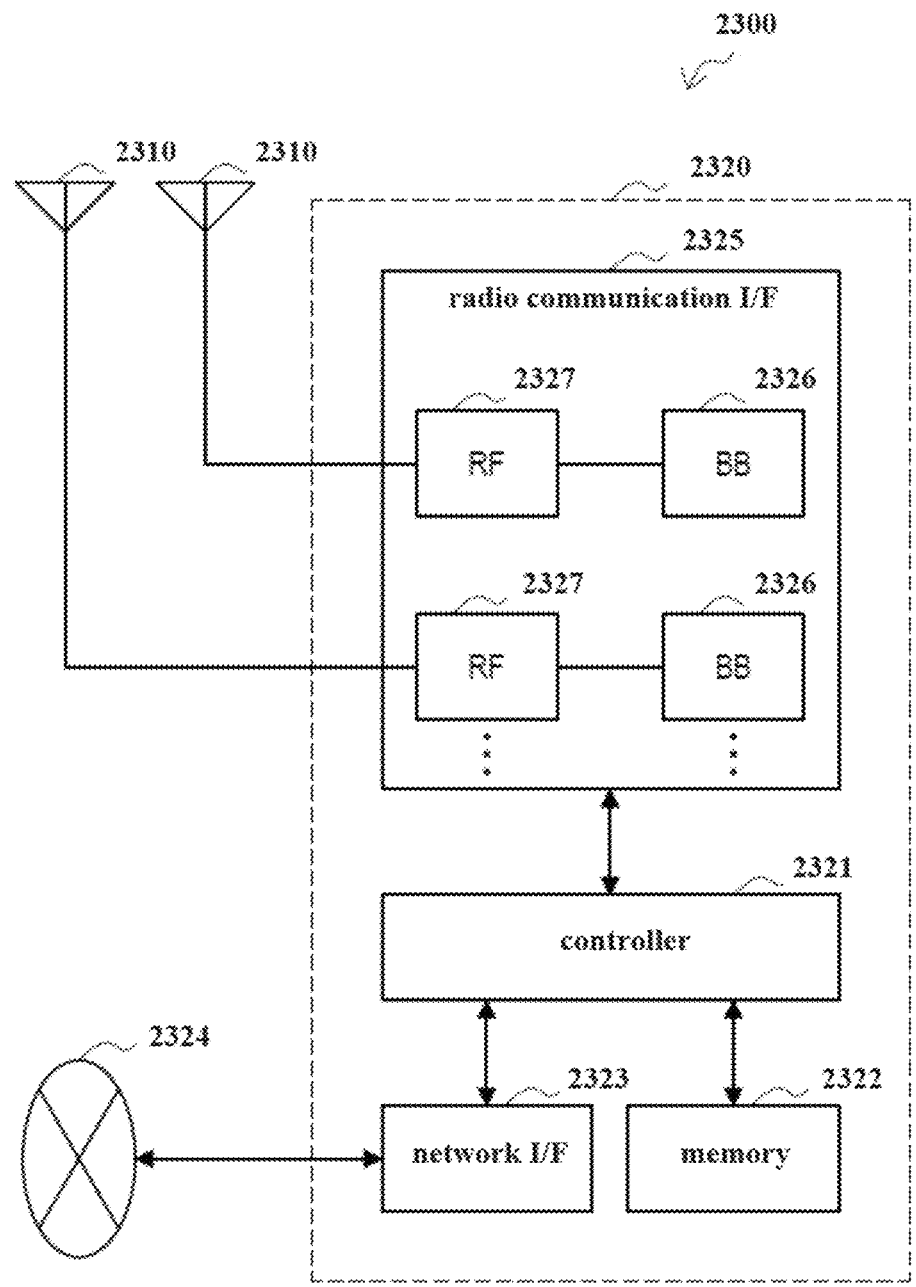
FIG. 20 is a block diagram showing an example of a schematic configuration of an eNB (evolved Node B) to which the technology according to the present disclosure may be applied.

FIG. 20 is a block diagram showing an example of a schematic configuration of an eNB to which the technology according to the present disclosure may be applied. An eNB 2300 includes one or more antennas 2310 and a base station device 2320. The base station device 2320 and each antenna 2310 may be connected to each other via a radio frequency (RF) cable.

Each of the antennas 2310 includes one or more antenna elements (such as multiple antenna elements included in a multiple input multiple output (MIMO) antenna) and is used by the base station device 2320 to transmit and receive a radio signal. As shown in FIG. 20, the eNB 2300 may include multiple antennas 2310. For example, the multiple antennas 2310 may be compatible with multiple frequency bands used by the eNB 2300. Although FIG. 20 shows an example in which the eNB 2300 includes multiple antennas 2310, the eNB 2300 may include a single antenna 2310.

The base station device 2320 includes a controller 2321, a memory 2322, a network interface 2323 and a radio communication interface 2325.

The controller 2321 may be a CPU or a DSP and control various functions of higher layers of the base station device 2320. For example, the controller 2321 generates a data packet based on data in a signal processed by the radio communication interface 2325, and transfers the generated packet via a network interface 2323. The controller 2321 may bind data from multiple baseband processors to generate a binding packet and transfer the generated binding packet. The controller 2321 may have logic functions for performing the following control: radio resource control, radio carrying control, mobility management, admission control and schedule. The control may be performed in combination with an adjacent eNB or a core network node. The memory 2322 includes RAM and ROM, and stores programs executed by the controller 2321 and various types of control data (such as a terminal list, transmission power data and scheduling data).

The network interface 2323 is configured to connect the base station device 2320 to a communication interface of the core network 2324. The controller 2321 may communication with the core network node or another eNB via the network interface 2323. In this case, the eNB 2300 and the core network node or another eNB may be connected to each other via a logic interface (such as an Si interface and an X2 interface). The network interface 2323 may be a wired communication interface or a radio communication interface for a wireless backhaul line. If the network interface 2323 is a radio communication interface, the network interface 2323 may use a higher frequency band for wireless communication as compared with the frequency band used by the radio communication interface 2325.

The radio communication interface 2325 supports any cellular communication scheme (such as long term evolution (LTE) and LTE-advanced), and provides a radio connection to a terminal located in a cell of the eNB 2300 via an antenna 2310. The radio communication interface 2325 may generally include a BB processor 2326 and an RF circuit 2327. The BB processor 2326 may perform for example encoding/decoding, modulating/demodulating and multiplexing/demultiplexing, and various types of signal processing of layers (such as L1, medium access control (MAC), radio link control (RLC) and packet data convergence protocol (PDCP)). Instead of the controller 2321, the BB processor 2326 may have a part or all of the above logic functions. The BB processor 2326 may be a memory storing communication control programs or a module including a processor configured to execute programs and a related circuit. Updating programs may change functions of the BB processor 2326. The module may be a card or a blade inserted into a slot of the base station device 2320. Alternatively, the module may be a chip installed on the card or the blade. The RF circuit 2327 may include for example a mixer, a filter or an amplifier, and transmits and receives a radio signal via the antenna 2310.

As shown in FIG. 20, the radio communication interface 2325 may include multiple BB processors 2326. For example, the multiple BB processors 2326 may be compatible with multiple frequency bands used by the eNB 2300. As shown in FIG. 20, the radio communication interface 2325 may include multiple RF circuits 2327. For example, the multiple RF circuits 2327 may be compatible with multiple antenna elements. Although FIG. 20 shows an example in which the radio communication interface 2325 includes multiple BB processors 2326 and multiple RF circuits 2327, the radio communication interface 2325 may include a single BB processor 2326 or a single RF circuit 2327.

In the eNB 2300 shown in FIG. 20, at least a part of the functions of the processing circuitry of the electronic device according to the embodiment of the disclosure may be implemented by the controller 2321. For example, the controller 2321 may perform at least a part of the functions of the processing circuitry and/or the units of the electronic device or the wireless communication device at the base station side according to the embodiment of the disclosure by performing the programs stored in the memory 2322.

[Application Example of a Car Navigation Device]

Figure 21:
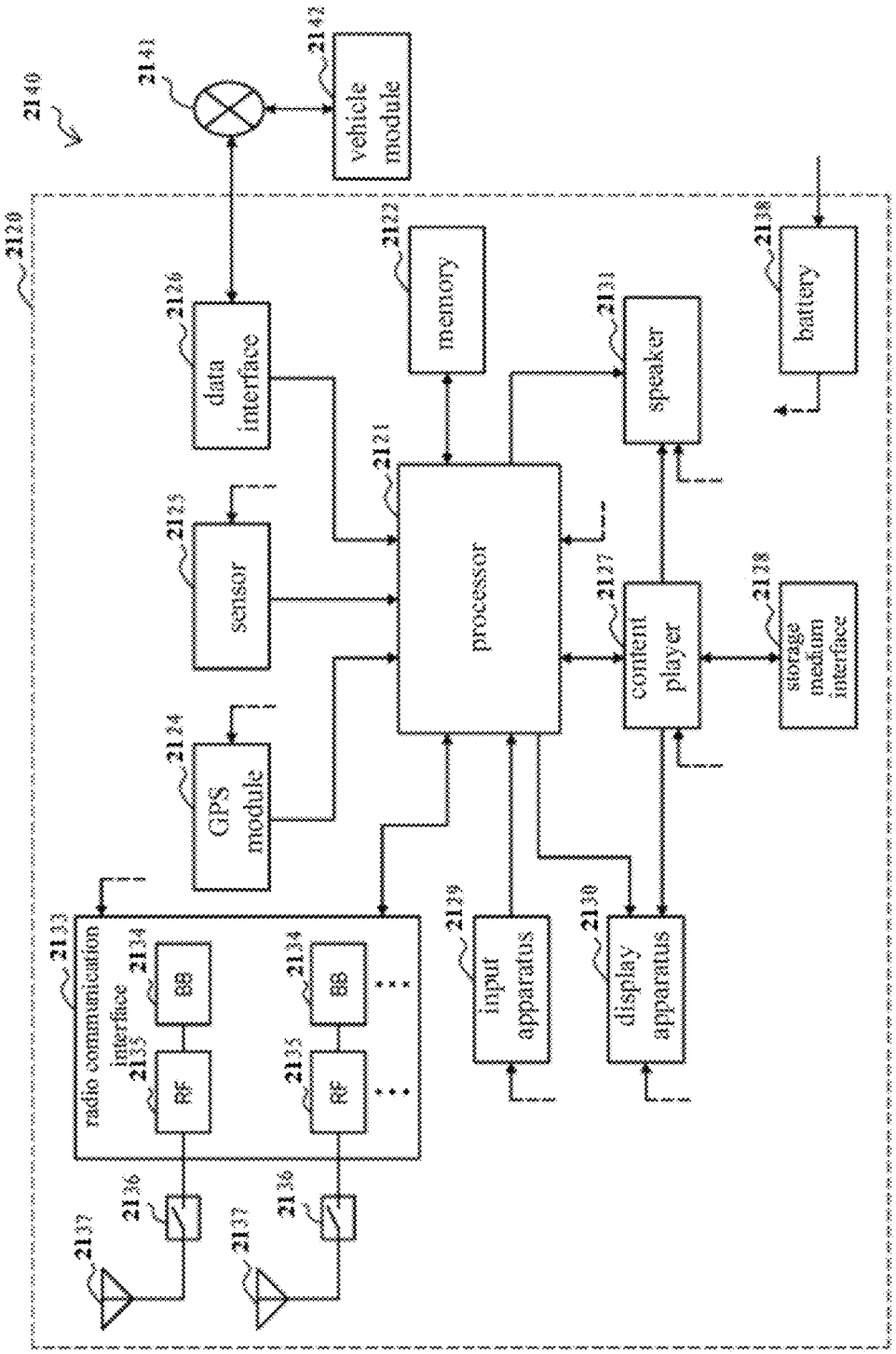
FIG. 21 is a block diagram showing an example of a schematic configuration of a car navigation device to which the technology according to the present disclosure may be applied.

FIG. 21 is a block diagram showing an example of a schematic configuration of a car navigation device 2120 to which the technology according to the present disclosure may be applied. The car navigation device 2120 includes a processor 2121, a memory 2122, a global positioning system (GPS) module 2124, a sensor 2125, a data interface 2126, a content player 2127, a storage medium interface 2128, an input apparatus 2129, a display apparatus 2130, a speaker 2131, a radio communication interface 2133, one or more antenna switches 2136, one or more antennas 2137, and a battery 2138.

The processor 2121 may be, for example, a CPU or a SoC, and controls a navigation function and another function of the car navigation device 2120. The memory 2122 includes RAM and ROM, and stores a program that is executed by the processor 2121, and data.

The GPS module 2124 uses GPS signals received from a GPS satellite to measure a position (such as latitude, longitude, and altitude) of the car navigation device 2120. The sensor 2125 may include a group of sensors such as a gyro sensor, a geomagnetic sensor, and an air pressure sensor. The data interface 2126 is connected to, for example, an in-vehicle network 2141 via a terminal that is not shown, and acquires data generated by the vehicle, such as vehicle speed data.

The content player 2127 reproduces content stored in a storage medium (such as a CD and a DVD) that is inserted into the storage medium interface 2128. The input apparatus 2129 includes, for example, a touch sensor configured to detect touch on a screen of the display apparatus 2130, a button, or a switch, and receives an operation or information inputted from a user. The display apparatus 2130 includes a screen such as a LCD or an OLED display, and displays an image of the navigation function or content that is reproduced. The speaker 2131 outputs sounds of the navigation function or the content that is reproduced.

The radio communication interface 2133 supports any cellular communication scheme (such as LTE and LTE-Advanced), and performs wireless communication. The radio communication interface 2133 may typically include, for example, a BB processor 2134 and an RF circuit 2135. The BB processor 2134 may perform, for example, encoding/decoding, modulating/demodulating, and multiplexing-demultiplexing, and performs various types of signal processing for wireless communication. Meanwhile, the RF circuit 2135 may include, for example, a mixer, a filter, and an amplifier, and transmits and receives radio signals via the antenna 2137. The radio communication interface 2133 may also be one chip module that has the BB processor 2134 and the RF circuit 2135 integrated thereon. The radio communication interface 2133 may include multiple BB processors 2134 and multiple RF circuits 2135, as illustrated in FIG. 21. Although FIG. 21 illustrates the example in which the radio communication interface 2133 includes the multiple BB processors 2134 and the multiple RF circuits 2135, the radio communication interface 2133 may also include a single BB processor 2134 or a single RF circuit 2135.

Furthermore, in addition to a cellular communication scheme, the radio communication interface 2133 may support another type of wireless communication scheme such as a short-distance wireless communication scheme, a near field communication scheme, and a wireless LAN scheme. In that case, the radio communication interface 2133 may include the BB processor 2134 and the RF circuit 2135 for each wireless communication scheme.

Each of the antenna switches 2136 switches connection destinations of the antennas 2137 among multiple circuits (such as circuits for different wireless communication schemes) included in the radio communication interface 2133.

Each of the antennas 2137 includes a single or multiple antenna elements (such as multiple antenna elements included in an MIMO antenna), and is used for the radio communication interface 2133 to transmit and receive radio signals. The car navigation device 2120 may include multiple antennas 2137, as illustrated in FIG. 21. Although FIG. 21 illustrates the example in which the car navigation device 2120 includes the multiple antennas 2137, the car navigation device 2120 may also include a single antenna 2137.

Furthermore, the car navigation device 2120 may include the antenna 2137 for each wireless communication scheme. In that case, the antenna switches 2136 may be omitted from the configuration of the car navigation device 2120.

The battery 2138 supplies power to blocks of the car navigation device 2120 illustrated in FIG. 21 via feeder lines that are partially shown as dashed lines in the drawing. The battery 2138 accumulates power supplied form the vehicle.

In the car navigation device 2120 illustrated in FIG. 21, the processor 2121 may perform at least a part of the functions of the processing circuitry of the electronic device according to the embodiment of the disclosure.

The technology of the present disclosure may also be realized as an in-vehicle system (or a vehicle) 2140 including one or more blocks of the car navigation device 2120, the in-vehicle network 2141, and a vehicle module 2142. The vehicle module 2142 generates vehicle data (such as vehicle speed, engine speed, and fault information), and outputs the generated data to the in-vehicle network 2141.

In the description of specific embodiments of the present disclosure above, features described and/or illustrated for one embodiment may be used in one or more other embodiments in the same or similar manner, combined with features in other embodiments, or substitute for features in other embodiments.

It should be noted that, terms "including/comprising" used herein refer to existing of features, elements, steps or components, but existing or adding of one or more other features, elements, steps or components is not excluded.

In the above embodiments and examples, reference numerals consisting of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed according to other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only schematic and are not intended to limit. For those skilled in the art, various changes, improvements or equivalents may be designed for the present disclosure within the spirit and scope of the appended claims. The changes, improvements or equivalents should be regarded as falling within the protection scope of the present disclosure.

The invention claimed is:

1. An electronic device for wireless communication, comprising:
   a processing circuitry configured to
     acquire information related to candidate links, each of the candidate links comprising a cellular link to another cell and a relay link via a candidate relay equipment, wherein acquiring the information is based on a user equipment obtaining a communication service from a current cell via a current relay equipment; and
     select a communication link to be applied to the user equipment from the candidate links based on the information, wherein
   the selection of the communication link comprises:
     determining priorities of the candidate links based on the information; and
     selecting the communication link from the candidate links based on the determined priorities;
   the information comprises:
     information about a measurement result of a cellular link of the user equipment to said another cell; and information indicating whether said another cell supports a relay link; and
wherein the determination of the priorities comprises, based on said another cell supporting the relay link:
based on a quality of the cellular link between the user equipment and said another cell being higher than a predetermined level, the priority of the cellular link to said another cell is higher than that of the relay link via another candidate relay equipment; and
based on the quality of the cellular link between the user equipment and said another cell being lower than the predetermined level, the priority of the cellular link to said another cell is lower than that of the relay link via the another candidate relay equipment.

2. The electronic device according to claim 1, wherein the information comprises a cell to which the candidate relay equipment belongs, wherein the determination of the priorities comprises determining a first priority of the candidate relay equipment of the current cell and a second priority of the candidate relay equipment of the another cell, and wherein the determination of the priorities comprises:
making the first priority of the candidate relay equipment of the current cell higher than the second priority of the candidate relay equipment of the another cell, based on the user equipment not satisfying a cell handover condition; and
making a priority of the candidate relay equipment of a handover target cell higher than the first priority of the candidate relay equipment of the current cell, based on the user equipment satisfying the cell handover condition.

3. The electronic device according to claim 1, wherein the information comprises information related to a remaining battery level of the user equipment, and the determination of the priorities comprises:
making the candidate relay equipment having a higher quality of cellular link have a higher priority, based on the remaining battery level of the user equipment being lower than a predetermined level.

4. The electronic device according to claim 1, wherein the priorities are determined based on one or more of following aspects, based on the another cell not supporting the relay link:
a quality of a link between the user equipment and a candidate relay equipment;
a quality of the cellular link between the user equipment and said another cell;
a remaining battery level of the user equipment and/or a candidate relay equipment; and
a traffic characteristic of the user equipment.

5. The electronic device according to claim 4, wherein the quality of the link between the user equipment and the candidate relay equipment is characterized by either a sidelink reference signal received power (S-RSRP) or a sidelink discovery reference signal received power (SD-RSRP).

6. The electronic device according to claim 1, wherein the processing circuitry is configured to select the communication link in response to a following trigger condition:
a quality of a link between the user equipment and the current relay equipment is lower than a predetermined level; or
a signaling for the user equipment indicates that the current relay equipment is not to be used anymore.

7. The electronic device according to claim 1, wherein the electronic device is arranged at a user equipment side, and the processing circuitry is configured to:
based on a selection being made to continue to adopt a relay link, prevent a measurement report related to a cell handover.

8. The electronic device according to claim 1, wherein the processing circuitry is configured to select preferentially the relay link as a communication link to be applied to a machine type communication (MTC) equipment.

9. The electronic device according to claim 1, wherein the electronic device is arranged at a base station side, and the processing circuitry is configured to:
based on the selected communication link to be applied to the user equipment being a relay link via a relay equipment of another cell, request a base station of said another cell for a resource allocation for the relay link.

10. An electronic device for wireless communication, comprising:
a processing circuitry configured to
trigger a user equipment to perform a link measurement comprising a measurement on a cellular link between the user equipment and a neighboring cell, wherein triggering the user equipment to perform the link measurement is based on a quality of a relay link between the user equipment and a first relay equipment being decreased to a predetermined level,
wherein the link measurement further comprises a measurement on a relay link between the user equipment and a second relay equipment, the second relay equipment being identified in information related to candidate links, each of the candidate links comprising a cellular link to another cell and a relay link via a candidate relay equipment, wherein
adjustment of a measurement configuration is triggered when a resource of the user equipment for a relay link measurement conflicts with a resource of the user equipment for a cellular link measurement.

11. An electronic device for wireless communication, comprising:
a processing circuitry configured to
acquire information related to a state of a link between a user equipment and a current relay equipment and a state of a link between the current relay equipment and a current cell, wherein acquiring the information is based on the user equipment obtaining a communication service from the current cell via the current relay equipment; and
adjust, based on the information, a measurement configuration of the user equipment with regard to candidate links, each of the candidate links comprising a cellular link to the current cell or another cell and a relay link via another relay equipment, wherein
the processing circuitry is configured to trigger the adjustment of the measurement configuration when a resource of the user equipment for a relay link measurement conflicts with a resource of the user equipment for a cellular link measurement.

12. The electronic device according to claim 11, wherein the adjustment comprises:
reducing relay link measurements for candidate relay equipments, based on a quality of a relay link between the user equipment and the current relay equipment and a quality of a cellular link between the current relay equipment and the current cell being higher than respective predetermined levels; and
increasing relay link measurements for candidate relay equipments, based on a quality of a relay link between the user equipment and the current relay equipment and a quality of a cellular link between the current relay equipment and the current cell being lower than respective predetermined levels.

13. The electronic device according to claim 11, wherein the adjustment comprises:
   turning off a cellular link measurement of the user equipment with regard to the current cell or another cell or increasing a cycle of the cellular link measurement, based on a quality of a relay link between the user equipment and the current relay equipment and a quality of a cellular link between the current relay equipment and the current cell being higher than respective predetermined levels; and
   turning on a cellular link measurement of the user equipment with regard to the current cell or another cell or decreasing a cycle of the cellular link measurement, based on a quality of a relay link between the user equipment and the current relay equipment and a quality of a cellular link between the current relay equipment and the current cell being lower than respective predetermined levels.

14. The electronic device according to claim 11, wherein the adjustment comprises:
   turning off a cellular link measurement of the user equipment with regard to the current cell or another cell or increasing a cycle of the cellular link measurement, based on the number of candidate relay equipments discovered by the user equipment within a predetermined time being larger than a predetermined threshold; and
   turning on a cellular link measurement of the user equipment with regard to the current cell or another cell or decreasing a cycle of the cellular link measurement, the number of candidate relay equipments discovered by the user equipment within a predetermined time being less than a predetermined threshold.

15. The electronic device according to claim 12, wherein the quality of the relay link and the quality of the cellular link comprise link stabilities characterized by respective link change rates, or
   wherein the quality of the relay link is characterized by sidelink reference signal received power S-RSRP or sidelink discovery reference signal received power SD-RSRP.

16. A wireless communication method, comprising:
   acquiring information related to a state of a link between a user equipment and a current relay equipment and a state of a link between the current relay equipment and a current cell, wherein acquiring the information is based on the user equipment obtaining a communication service from the current cell via the current relay equipment; and
   adjusting, based on the information, a measurement configuration of the user equipment with regard to candidate links, each of the candidate links comprising a cellular link to the current cell or another cell and a relay link via another relay equipment, wherein
   the adjustment of the measurement configuration is triggered when a resource of the user equipment for a relay link measurement conflicts with a resource of the user equipment for a cellular link measurement.

* * * * *